(12) United States Patent
Murphy et al.

(10) Patent No.: US 11,671,266 B2
(45) Date of Patent: Jun. 6, 2023

(54) PROVIDING A FIRST DIGITAL CERTIFICATE AND A DNS RESPONSE

(71) Applicant: Siemens Healthcare GmbH, Erlangen (DE)

(72) Inventors: Ivan Murphy, Baiersdorf (DE); Michael Rommel, Erlangen (DE); Martin Siegmund, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 17/537,702

(22) Filed: Nov. 30, 2021

(65) Prior Publication Data

US 2022/0182246 A1    Jun. 9, 2022

(30) Foreign Application Priority Data

Dec. 7, 2020  (EP) ..................................... 20212145
Dec. 30, 2020 (EP) ..................................... 20217801

(51) Int. Cl.
*H04L 9/32* (2006.01)
*H04L 61/4511* (2022.01)
(Continued)

(52) U.S. Cl.
CPC ............ *H04L 9/3268* (2013.01); *H04L 9/085* (2013.01); *H04L 9/0825* (2013.01); *H04L 9/14* (2013.01);
(Continued)

(58) Field of Classification Search
USPC ......................................................... 713/156
See application file for complete search history.

(56) References Cited

U.S. PATENT DOCUMENTS 6,148,404 A * 11/2000 Yatsukawa ............ H04L 9/0869
726/2
6,397,329 B1 * 5/2002 Aiello ................... H04L 9/3268
713/168
(Continued)

FOREIGN PATENT DOCUMENTS

CN     104579676 A    4/2015
CN     107800682 A    3/2018
(Continued)

OTHER PUBLICATIONS

Bassil et al.; Security Analysis and Solution for Thwarting Cache Poisoning Attacks in the Domain Name System; 9th International Conference on Telecommunications (ICT 2012) (Year: 2012).*
(Continued)

*Primary Examiner* — Amare F Tabor
*Assistant Examiner* — Mahabub S Ahmed
(74) *Attorney, Agent, or Firm* — Harness, Dickey & Pierce, P.L.C.

(57) ABSTRACT

A computer-implemented method is for providing a digital certificate to a device. In an embodiment, the method is based on receiving, from the device, authentication data via a secure communication channel. Furthermore, the method is based on receiving, from the device, or determining, by the server, a first certificate identifier. In particular, the first certificate identifier is a hash value. Further aspects of the method are verifying the authentication data and receiving, from the device, a first public key created by the device. In an embodiment, the method is furthermore based on sending a first certificate signing request related to a first domain name based on the first public key to a certificate authority. Herein, the first domain name comprises the certificate identifier, and a domain related to the first domain name is (Continued)

controlled by the server. In particular, the first domain name is a wildcard domain.

15 Claims, 16 Drawing Sheets

(51) Int. Cl.
*H04L 9/08* (2006.01)
*H04L 9/14* (2006.01)
(52) U.S. Cl.
CPC ........ *H04L 9/3247* (2013.01); *H04L 61/4511* (2022.05)

(56) References Cited

U.S. PATENT DOCUMENTS

| | | | | |
|---|---|---|---|---|
| 6,823,454 | B1* | 11/2004 | Hind | H04L 61/4511 713/168 |
| 6,826,690 | B1* | 11/2004 | Hind | G06F 21/31 713/176 |
| 8,145,899 | B2* | 3/2012 | Trench | G06Q 20/355 713/157 |
| 2003/0163567 | A1* | 8/2003 | McMorris | H04L 67/04 709/225 |
| 2004/0059793 | A1* | 3/2004 | Gruber | G06F 16/9566 707/E17.115 |
| 2005/0114666 | A1* | 5/2005 | Sudia | G06F 21/645 713/175 |
| 2006/0264202 | A1* | 11/2006 | Hagmeier | H04L 69/22 455/411 |
| 2006/0282795 | A1* | 12/2006 | Clark | G06Q 10/10 715/779 |
| 2009/0245240 | A1* | 10/2009 | Mao | H04L 65/1016 370/352 |
| 2011/0213966 | A1 | 9/2011 | Fu et al. | |
| 2013/0067115 | A1* | 3/2013 | Lapanc | H04L 61/106 709/245 |
| 2013/0111560 | A1* | 5/2013 | Arenas | H04L 67/51 726/4 |
| 2013/0198409 | A1* | 8/2013 | Holliday | H04L 67/1014 709/238 |
| 2013/0198511 | A1* | 8/2013 | Yoo | H04L 63/0823 713/156 |
| 2014/0149735 | A1* | 5/2014 | Tenenboym | H04L 63/0823 713/176 |
| 2015/0113267 | A1* | 4/2015 | Busser | H04L 9/30 713/156 |
| 2015/0121078 | A1* | 4/2015 | Fu | H04L 9/3263 713/175 |
| 2015/0242903 | A1* | 8/2015 | Peebles | H04W 4/24 705/14.64 |
| 2018/0060608 | A1 | 3/2018 | Holden | |
| 2018/0062855 | A1* | 3/2018 | Bracken | H04L 9/14 |
| 2018/0234257 | A1* | 8/2018 | Kommireddy | H04L 9/321 |
| 2018/0254896 | A1* | 9/2018 | Moysi | H04L 63/0823 |
| 2018/0316510 | A1* | 11/2018 | Rai | H04L 9/3268 |
| 2019/0026458 | A1* | 1/2019 | Choules | H04L 63/20 |
| 2020/0021446 | A1* | 1/2020 | Roennow | H04L 63/1458 |
| 2021/0051029 | A1* | 2/2021 | Pham | G06F 21/33 |
| 2022/0051498 | A1* | 2/2022 | Hart | G07C 9/00309 |
| 2022/0129559 | A1* | 4/2022 | Duval | G06F 21/575 |
| 2022/0166746 | A1* | 5/2022 | Cheng | H04L 61/30 |
| 2022/0224517 | A1* | 7/2022 | Zhu | H04L 9/3265 |

FOREIGN PATENT DOCUMENTS

| CN | 110537346 A | 12/2019 |
|---|---|---|
| WO | WO 2014053172 A1 | 4/2014 |
| WO | WO 2015116237 A1 | 8/2015 |

OTHER PUBLICATIONS

Partial European Search Report dated May 14, 2021.
Extended European Search Report dated Aug. 16, 2021.
European Intention to Grant dated Jul. 4, 2022.
Nystrom M. et al. "PKCS #10: Certification Request Syntax Specification Version 1.7", Network Working Group, 2000 https://tools.ietf.org/html/rfc2986").
Filippo Valsorda.:"How Plex is Doing https for All Its Users" Jun. 6, 2015 on Mainline | TLS https://blog.filippo.io/how-plex-is-doing-https-for-all-its-users/Stand: 09.12.2020.
Mockapetris P."Domain names, Implementation and specification", 1987, Network Working Group, https://tools.ietf.org/html/rfc1035.
Barnes R et al"Automatic Certificate Management Environment (ACME)", ISSN ISSN: 2070-1721, https://tools.ietf.org/html/rfc8555.

* cited by examiner

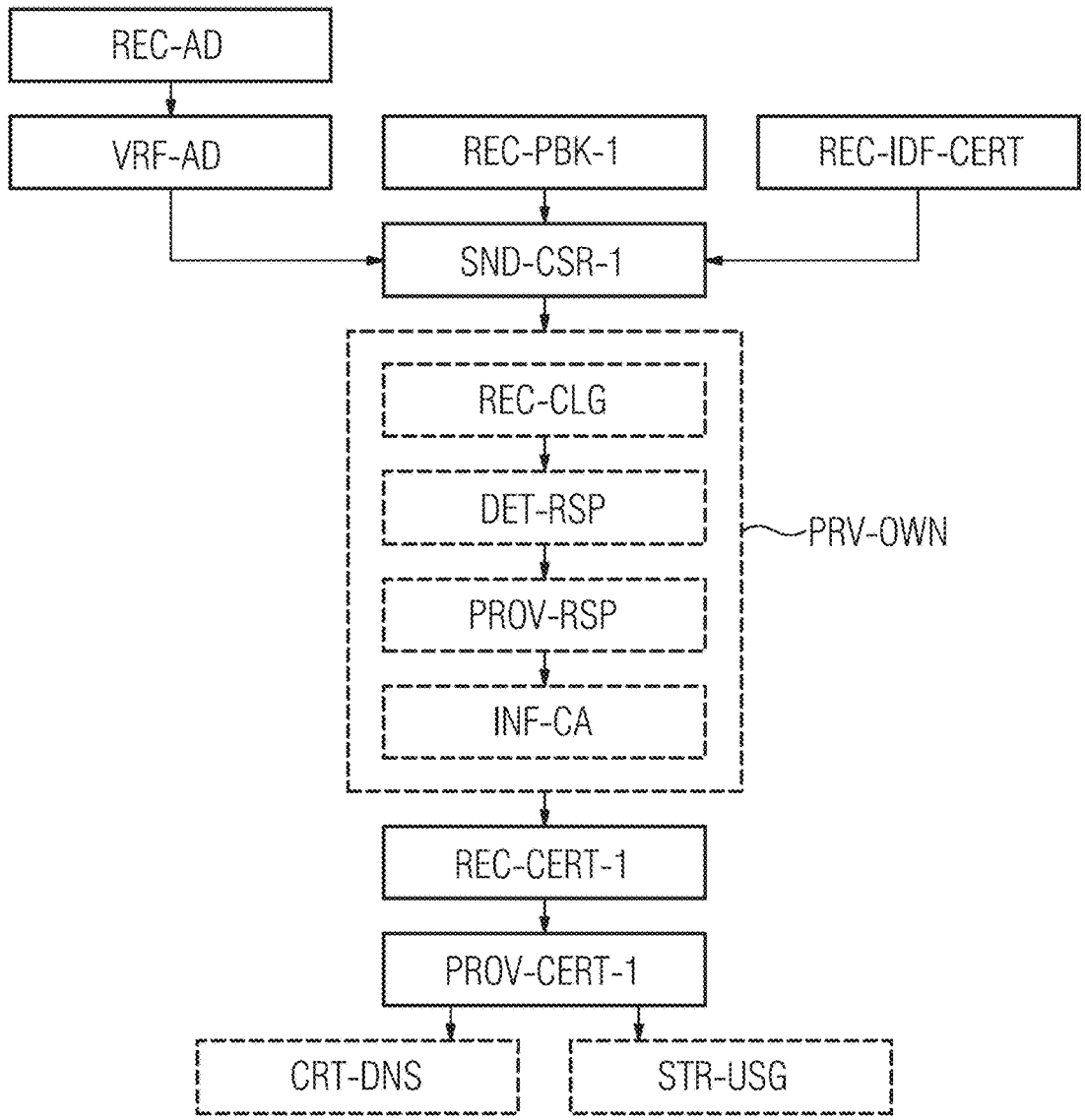
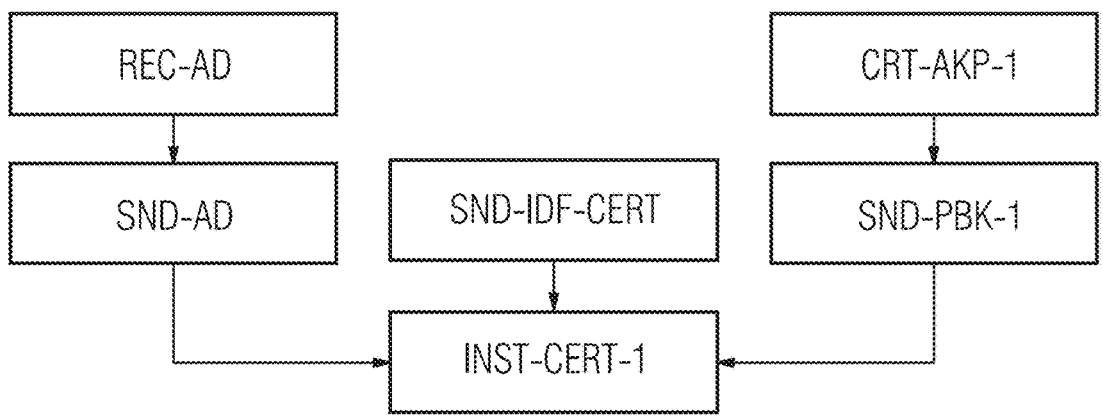

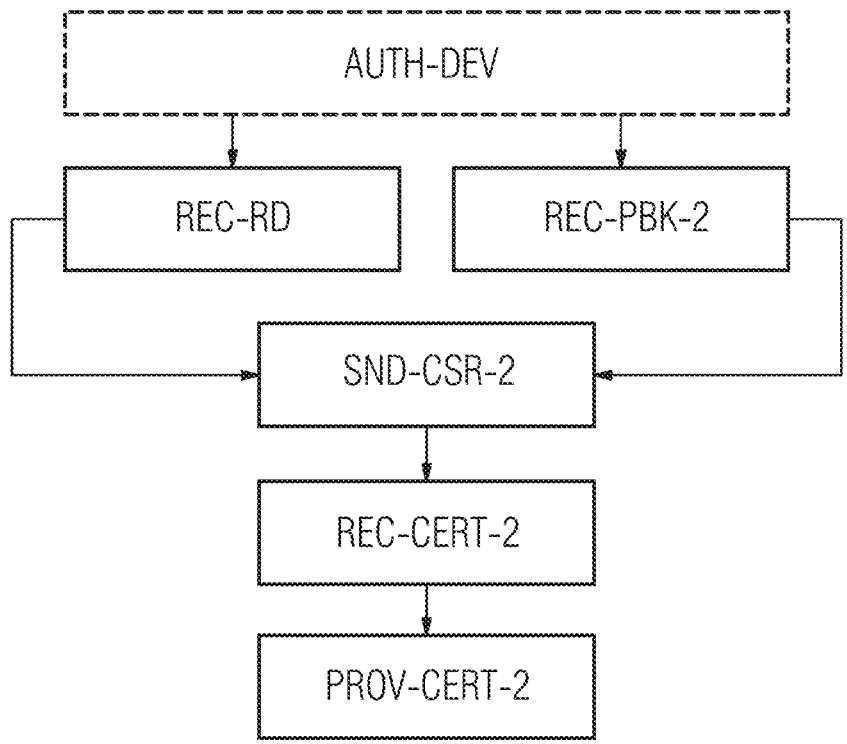
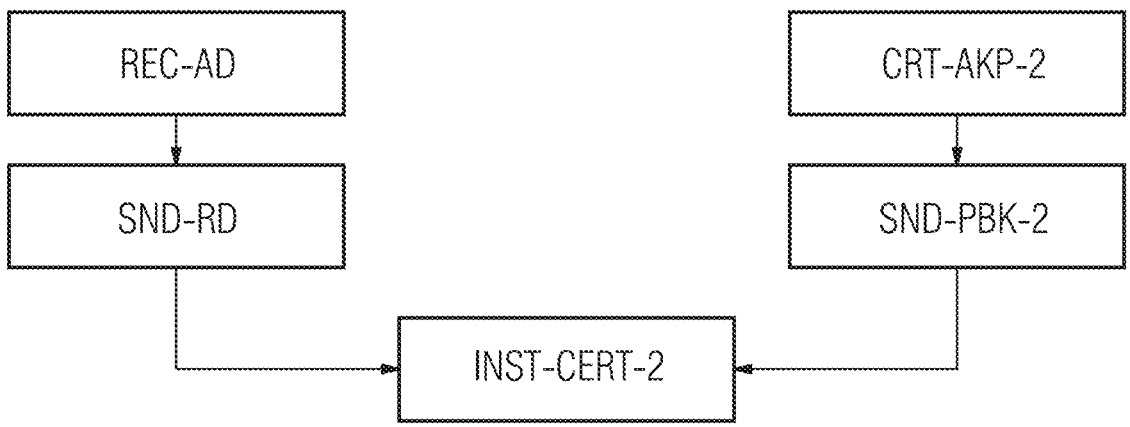

PROVIDING A FIRST DIGITAL CERTIFICATE AND A DNS RESPONSE

PRIORITY STATEMENT

The present application hereby claims priority under 35 U.S.C. § 119 to European patent application numbers EP20212145.5 filed Dec. 7, 2020 and EP20217801.8 filed Dec. 30, 2020, the entire contents of each of which are hereby incorporated herein by reference.

FIELD

Example embodiments of the invention generally relate to a method of providing a first digital certificate and a DNS response.

BACKGROUND

Security of information technology (acronym IT) devices or systems is often based on digital certificates (or "trust anchors") usable for secure communication between different devices, e.g. based on the HTTPS protocol (acronym for "Hypertext Transfer Protocol Secure") or the FTPS protocol (acronym for "File Transfer Protocol Secure"). In particular, digital certificates can be used for client-server communication.

Security of IT systems is very important for medical technology, both because medical relevant systems need to be protected from malicious attacks (to ensure that patients are not harmed based on compromised data or compromised hardware), and because patient data is personal data and should not be exposed to the public due to data privacy concerns.

There are several existing solutions for creating and distribution digital certificates within a local IT infrastructure, in particular, within a hospital IT infrastructure.

For example, it is possible to use self-signed certificates (either signed by the manufacturer of the respective device, or internally within the local IT infrastructure) for every device in a local IT infrastructure to enable secured communication between the local devices. However, self-signed certificates are not trusted by modern internet browsers and results in either the communication being blocked by the browser or a at least a security warning being shown to the end user.

Alternatively, within the local IT infrastructure an Internal Trust Authority can be used, e.g. in the form of a dedicated server. However, setting up such an Internal Trust Authority is complicated and might also be cost-intensive.

For many local IT infrastructures, it would be desirable to have a service provider for providing a certificate infrastructure (in the sense of "secure communication as a service", or "digital certificates of a service"). The digital certificates provided may be based on a domain controlled by the service provider (e.g. "abc.service-provider.com"), however, requests directed to those domains (e.g. HTTPS requests) could not be resolved to a local IP address within the local IT infrastructure. In the alternative, the digital certificates provided may be based on a domain controlled by the local IT infrastructure (e.g. "abc.hospital-xyz.com"), however, the service provider is not able to request a certificate based on such a domain, because he cannot prove the ownership e.g. based on the ACME protocol.

SUMMARY

Embodiments of the present invention are directed to the creation and provisioning of digital certificates for devices inside a local IT infrastructure by a server outside of the local IT infrastructure. In particular, the local IT infrastructure corresponds to the IT infrastructure of a healthcare provider, e.g. a hospital.

Further advantageous embodiments and additional advantageous features are described in the claims and in the specification.

In the following, embodiments of the invention are described with respect to systems as well as with respect to the methods. Features, advantages or alternative embodiments herein can be assigned to the other corresponding objects and vice versa. In other words, the systems can be improved with features described or claimed in the context of the corresponding method, and vice versa. In this case, the functional features of the methods are embodied by objective units of the systems.

In one embodiment, the invention relates to a computer-implemented method for providing a digital certificate to a device. The method is based on receiving, from the device, authentication data via a secure communication channel. In particular, the authentication data can be used for ensuring the identity of the device and the reliability and security of the communication. Furthermore, the method is based on receiving, from the device, or determining, by the server, a first certificate identifier.

In particular, the first certificate identifier is a hash value. In other words, either a step of receiving, from the device, the first certificate identifier or the step determining, by the server, the first certificate identifier is executed. Further steps of the method are verifying the authentication data and receiving, from the device, a first public key created by the device.

The invention relates in another embodiment to a computer-implemented method for providing a DNS response. This method is based on receiving, from a requestor, an DNS request for resolving a fully qualified domain name, wherein the fully qualified domain name comprises as a label an encoded domain name. The method furthermore comprises determining a decoded domain name based on the encoded domain name, and providing, to the requestor, a DNS response, wherein the DNS response comprises the decoded domain name. In particular, the DNS response comprise a CNAME resource record based on the decoded domain name.

The invention relates in another embodiment to a server for providing a first digital certificate to a device, comprising an interface and a computation unit, configured for receiving, from the device, authentication data via a secure communication channel, configured for receiving, from the device, or determining, by the server, a first certificate identifier, in particular, wherein the first certificate identifier is a hash value or random value, configured for verifying the authentication data, configured for receiving, from the device, a first public key created by the device, configured for sending a first certificate signing request related to a first domain name based on the first public key to a certificate authority, wherein the first domain name comprises the certificate identifier, and wherein a domain related to the first domain name (DN-1) is controlled by the server, configured for receiving the first digital certificate from the certificate authority, wherein the first digital certificate is a wildcard certificate based on the first domain name and the first public key signed by the certificate authority, configured for providing the first digital certificate to the device.

The invention relates in another embodiment to a device comprising an interface and a computation unit, configured for:

determining authentication data for authenticating the device at a server, optionally sending a first certificate identifier to the server, in particular, wherein the first certificate identifier is a hash value or a random value, creating a first asymmetric key pair, the asymmetric key pair comprising a first public key and a first private key, sending the first public key to the server, receiving and installing a first digital certificate on the device.

The invention relates in another embodiment to a client comprising an interface and a computation unit, the client being a client of a device, configured for determining registration data, sending the registration data to the device, creating a second asymmetric key pair, the second asymmetric key pair comprising a second public key PBK-1 and a second private key, sending the second public key to the device, receiving and installing a second digital certificate.

The invention relates in another embodiment to a DNS server comprising an interface and a computation unit, configured for:

receiving, from a requestor, an request for resolving a fully qualified domain name, wherein the fully qualified domain name comprises as a label an encoded domain name, determining a decoded domain name based on the encoded domain name, providing, to the requestor, a DNS response, wherein the DNS response comprises the decoded domain name.

The invention relates in another embodiment to a computer program product comprising instructions which, when the program is executed by a computer, cause the computer to carry out one of the methods according to the invention and its embodiments. Furthermore, the invention relates to a computer-readable medium comprising instructions which, when executed by a computer, cause the computer to carry out one of the methods according to the invention and its embodiments.

The invention relates in another embodiment to a computer-implemented method for providing, by a server, a first digital certificate to a device, the computer-implemented method comprising:

receiving, from the device, authentication data via a secure communication channel;

receiving from the device, or determining by the server, a first certificate identifier;

verifying the authentication data;

receiving, from the device, a first public key created by the device;

sending a first certificate signing request, related to a first domain name based on the first public key, to a certificate authority, the first domain name including the first certificate identifier and a domain related to the first domain name being controlled by the server;

receiving the first digital certificate from the certificate authority, the first digital certificate being a wild-card certificate based on the first domain name, and the first public key being signed by the certificate authority; and providing the first digital certificate to the device.

The invention relates in another embodiment to a computer-implemented method for providing a DNS response, comprising:

receiving, from a requestor, an DNS request for resolving a fully qualified domain name, the fully qualified domain name including, as a label, an encoded domain name;

determining a decoded domain name based on the encoded domain name; and providing, to the requestor, a DNS response including the decoded domain name.

The invention relates in another embodiment to a server for providing a first digital certificate to a device, comprising an interface and a computation unit, configured to receive, from the device, authentication data via a secure communication channel;

configured to receive from the device, or determining by the server, a first certificate identifier;

configured to verify the authentication data;

configured to receive, from the device, a first public key created by the device;

configured to send a first certificate signing request, related to a first domain name based on the first public key, to a certificate authority, the first domain name including the certificate identifier, and wherein a domain related to the first domain name is controlled by the server;

configured to receive the first digital certificate from the certificate authority, the first digital certificate being a wild-card certificate based on the first domain name and the first public key signed by the certificate authority; and configured to provide the first digital certificate to the device.

The invention relates in another embodiment to a non-transitory computer program product storing instructions which, when the program is executed by a computer, cause the computer to carry out the computer-implemented method of an embodiment.

The invention relates in another embodiment to a non-transitory computer-readable medium storing instructions which, when executed by a computer, cause the computer to carry out the computer-implemented method of an embodiment.

BRIEF DESCRIPTION OF THE DRAWINGS

The properties, features and advantages of this invention described above, as well as the manner they are achieved, become clearer and more understandable in the light of the following description and embodiments, which will be described in detail in the context of the drawings. This following description does not limit the invention on the contained embodiments. Same components or parts can be labeled with the same reference signs in different figures. In general, the figures are not for scale.

The numbering and/or order of method steps is intended to facilitate understanding and should not be construed, unless explicitly stated otherwise, or implicitly clear, to mean that the designated steps have to be performed according to the numbering of their reference signs and/or their order within the figures. In particular, several or even all of the method steps may be performed simultaneously, in an overlapping way or sequentially.

Figure 1:
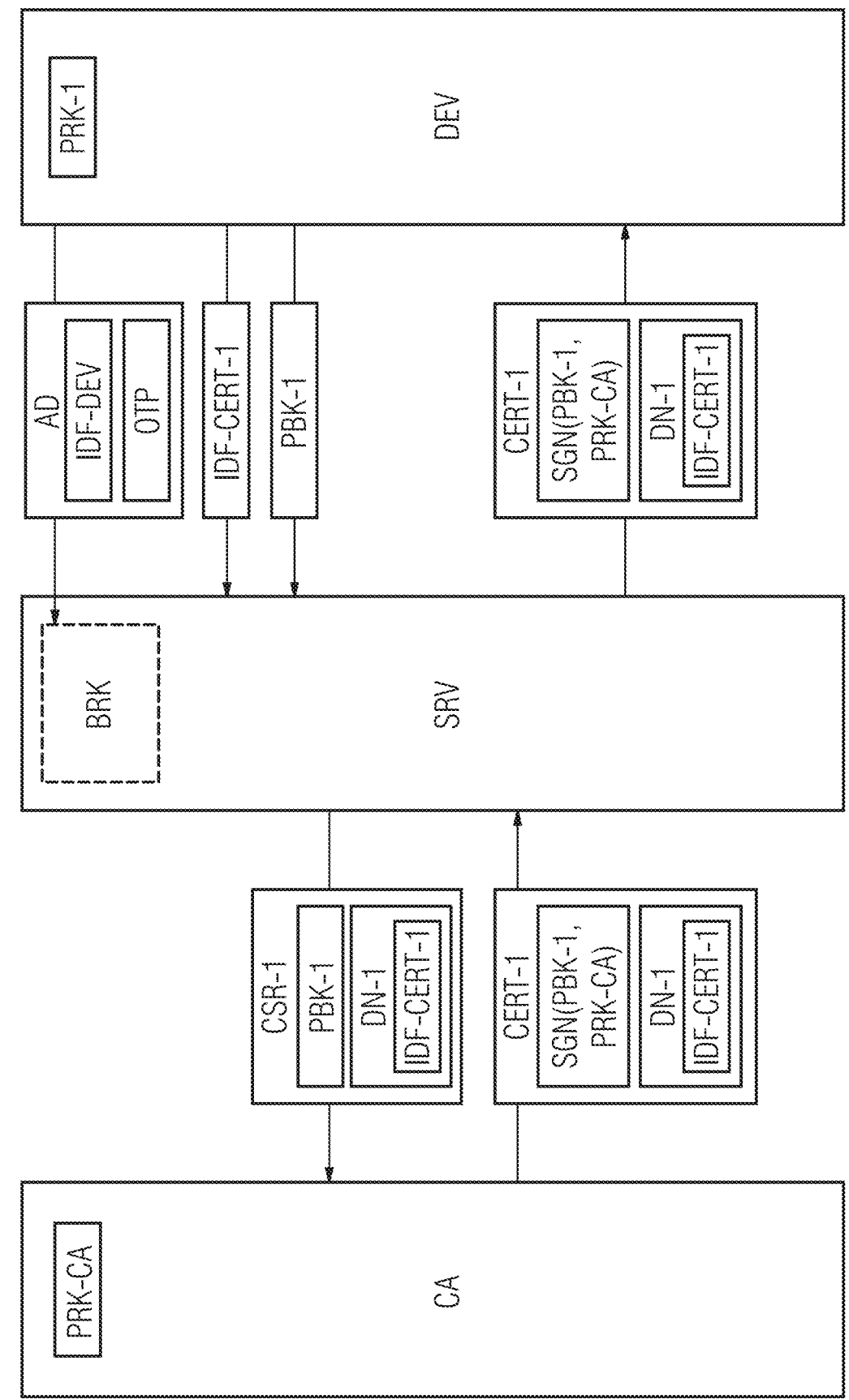
Figure 2:
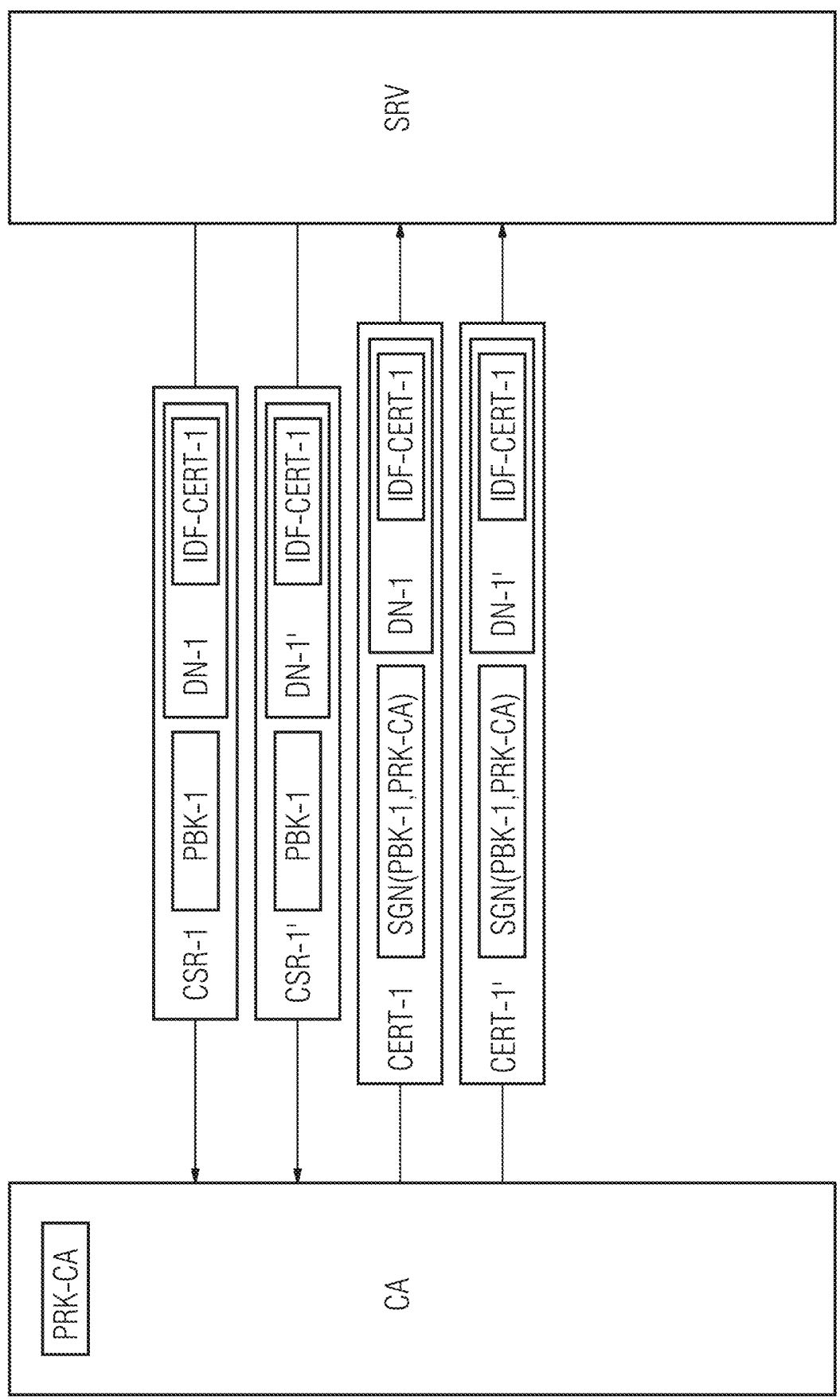
Figure 3:
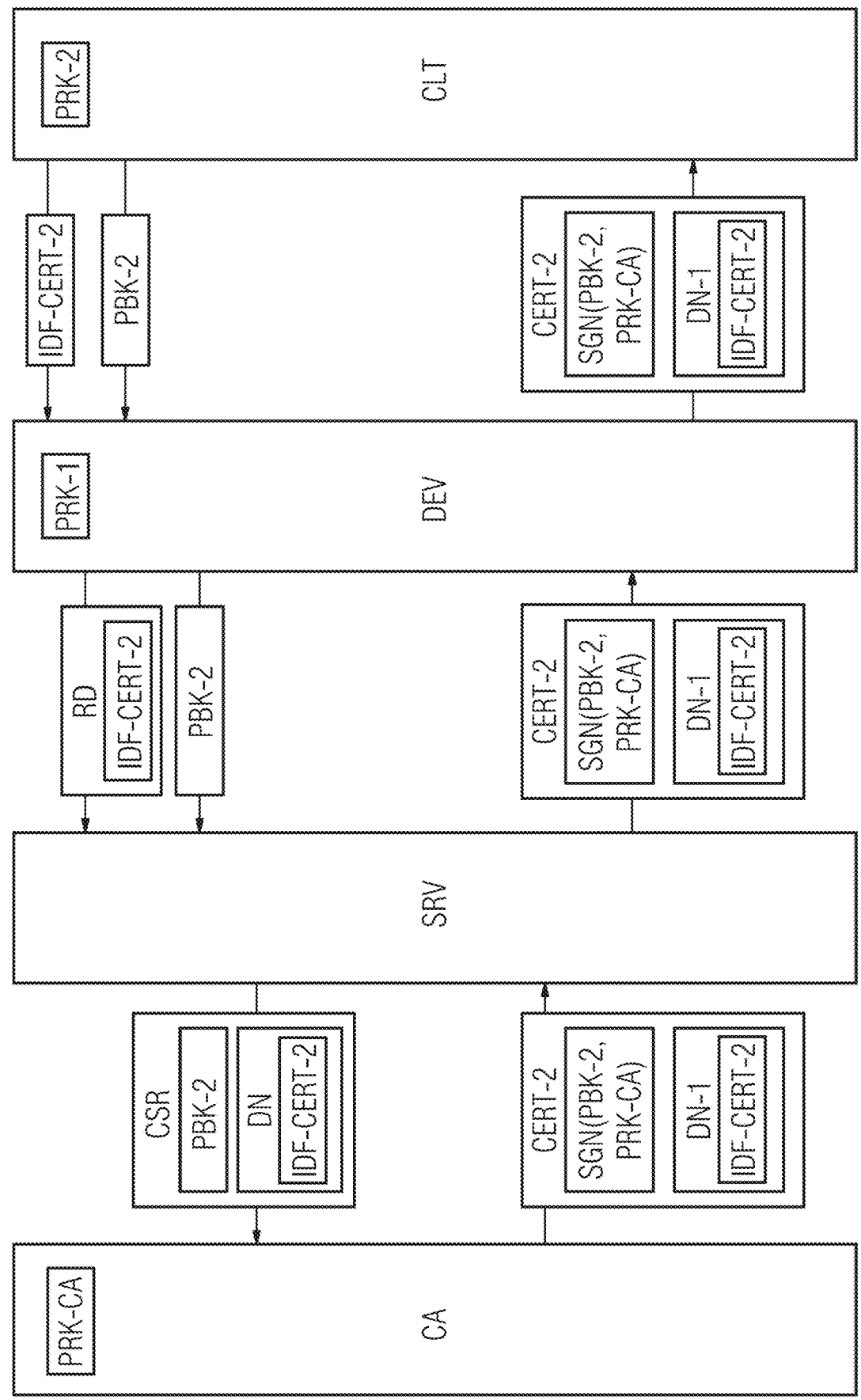
Figure 4:
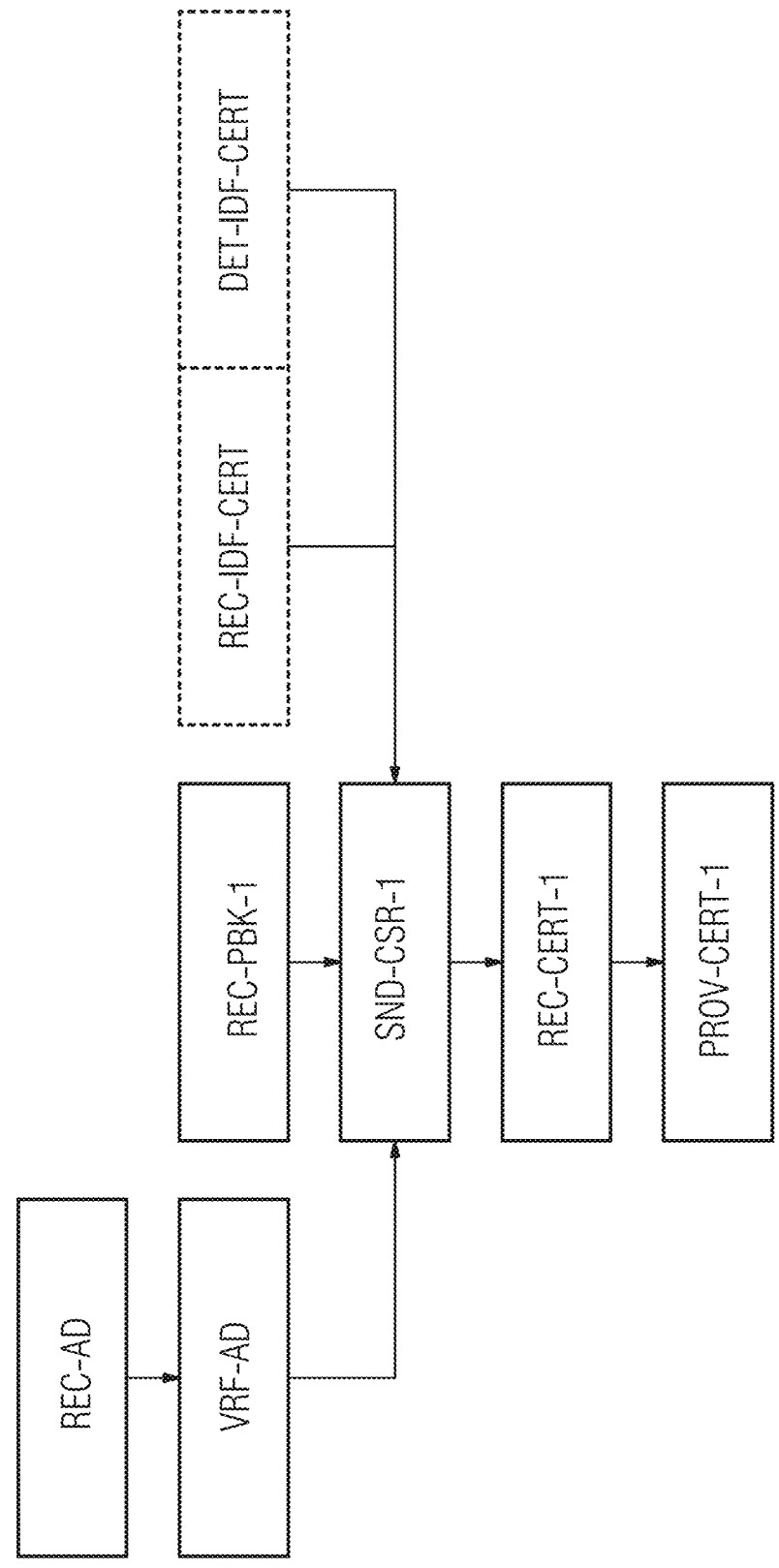
Figure 7:
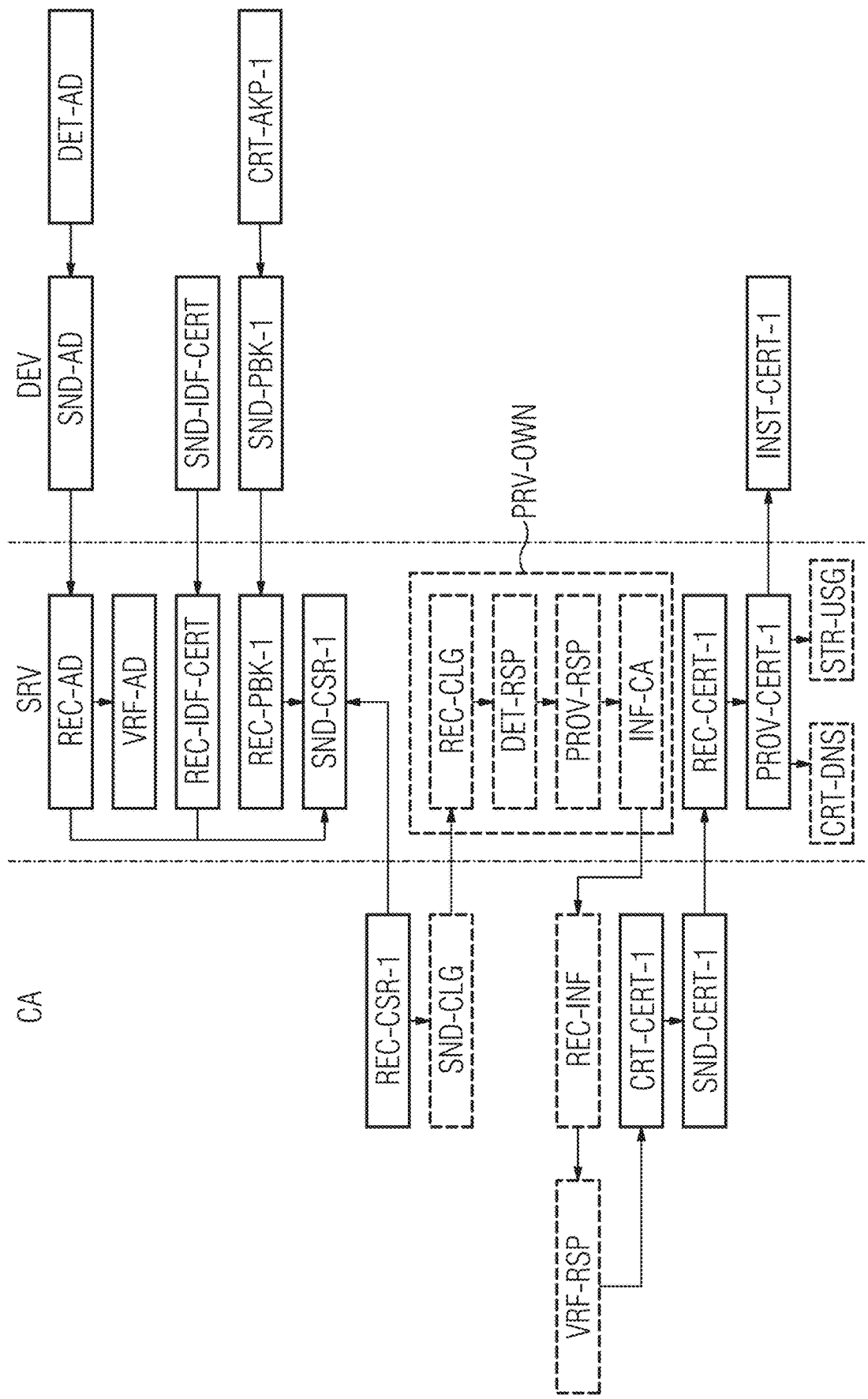
Figure 8:
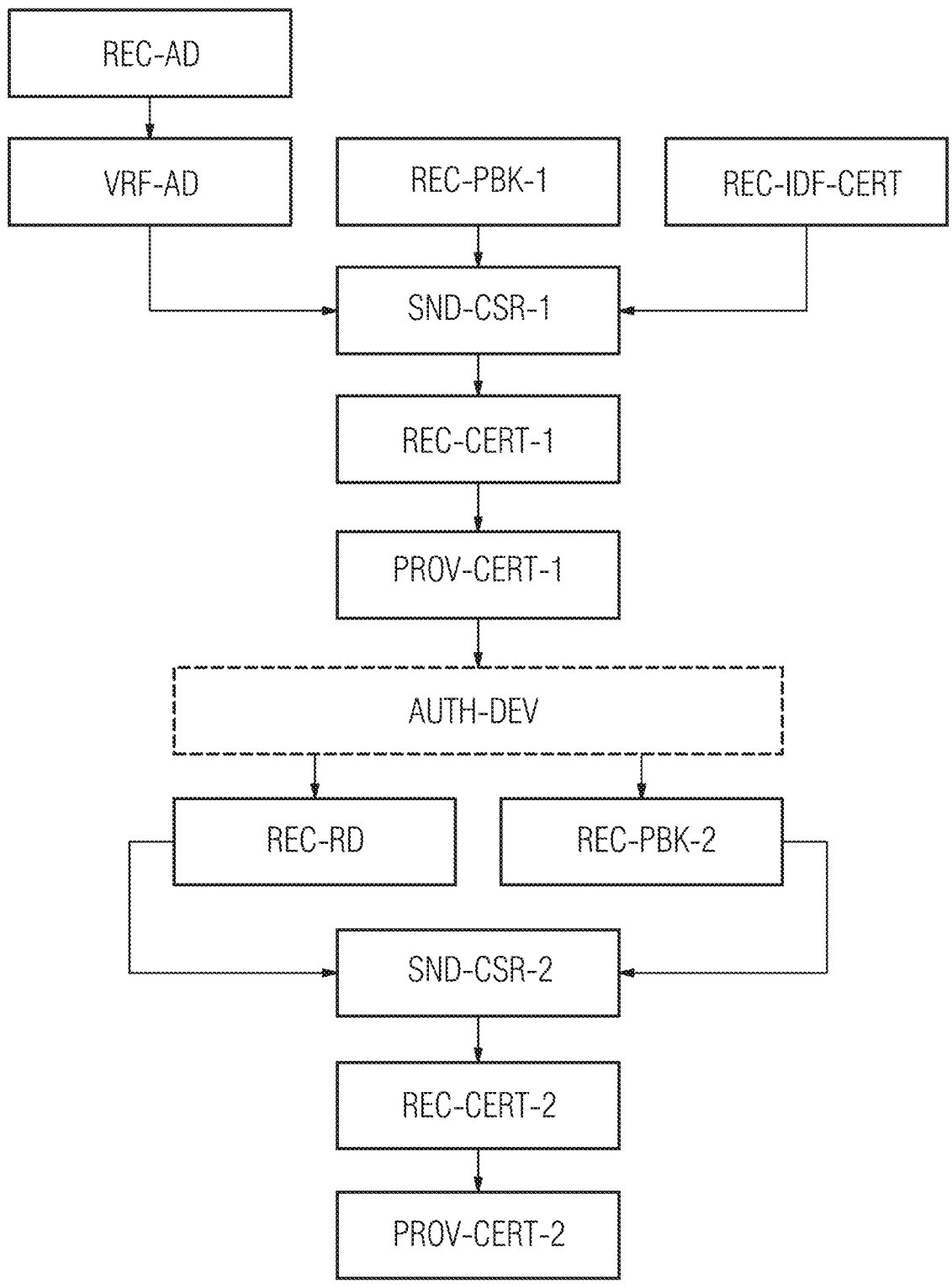
Figure 11:
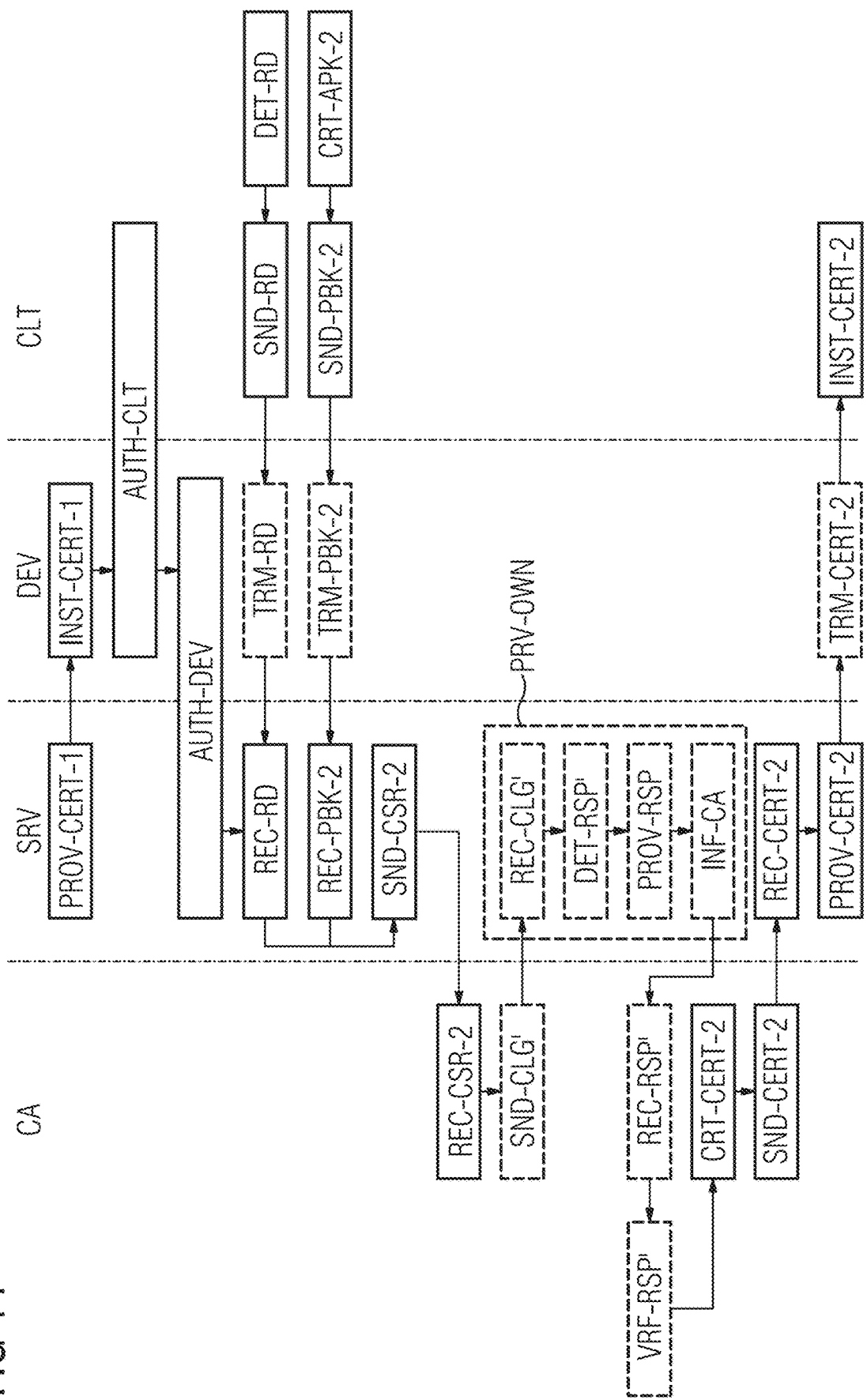
Figure 12:
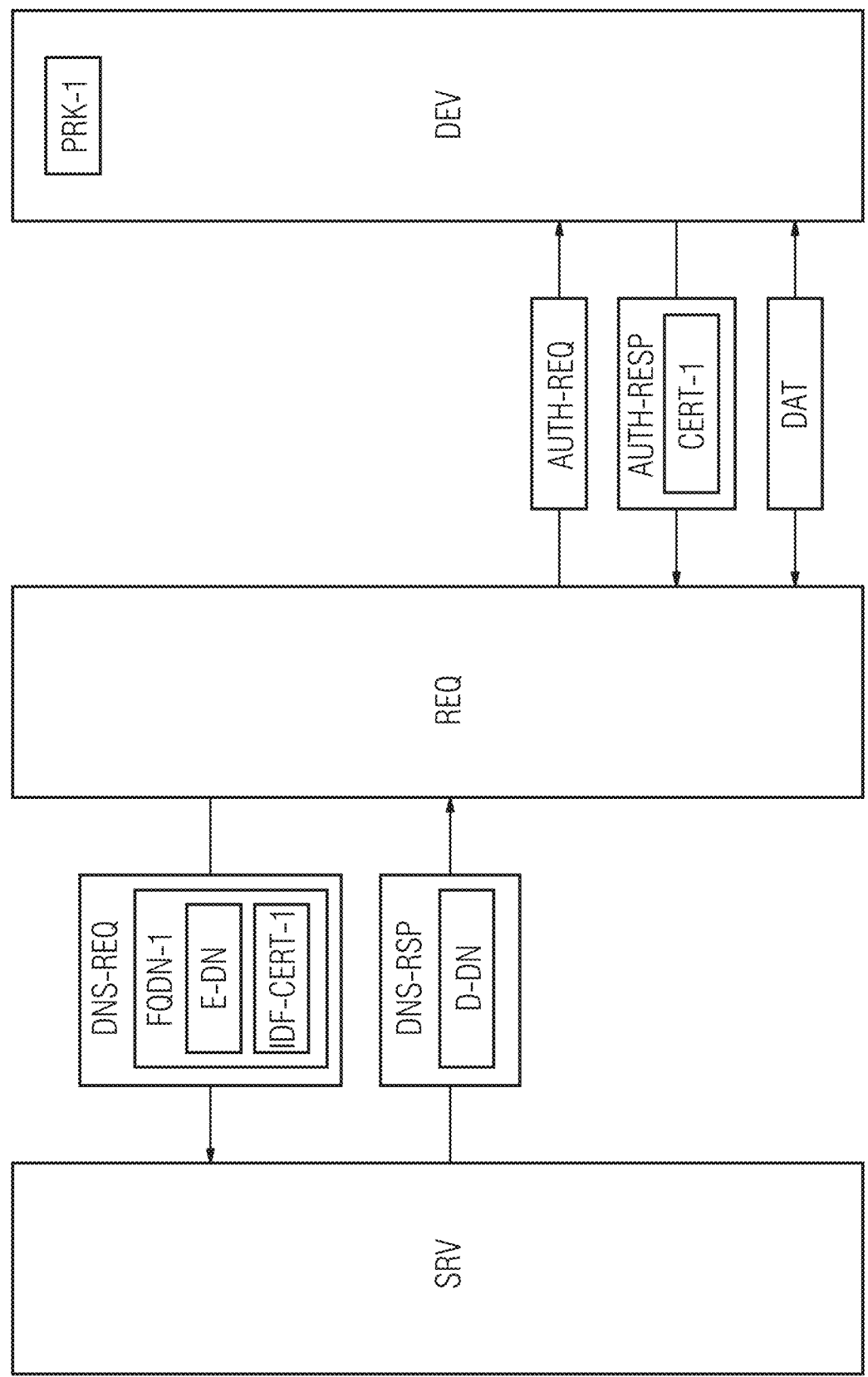
Figure 13:
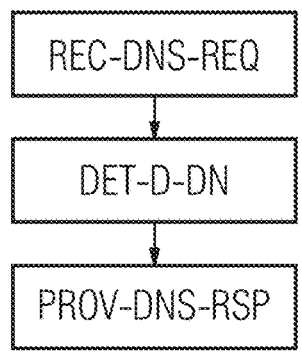
Figure 14:
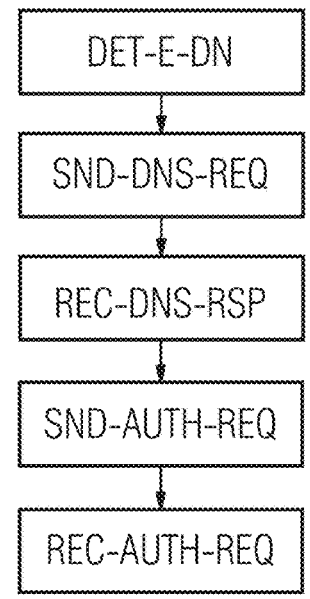
Figure 15:
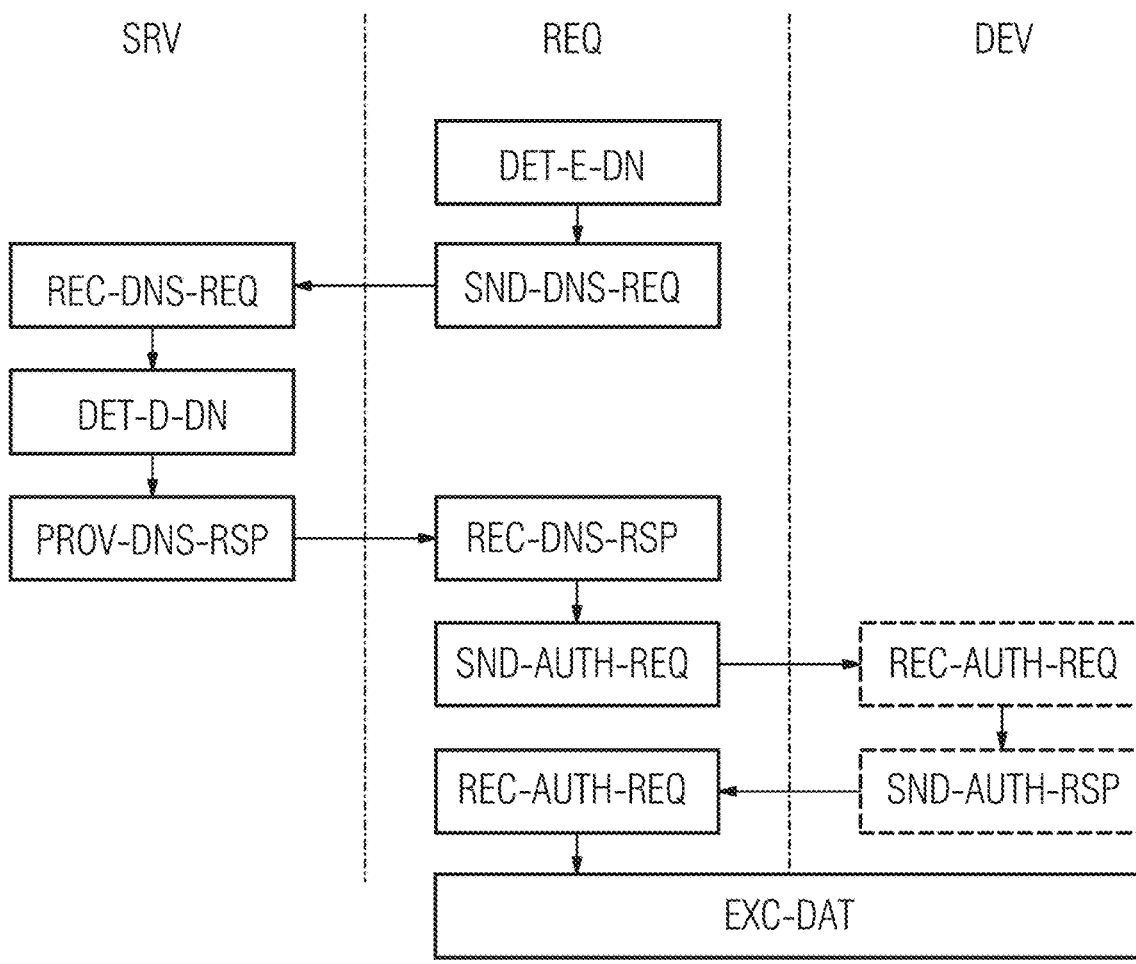
Figure 16:
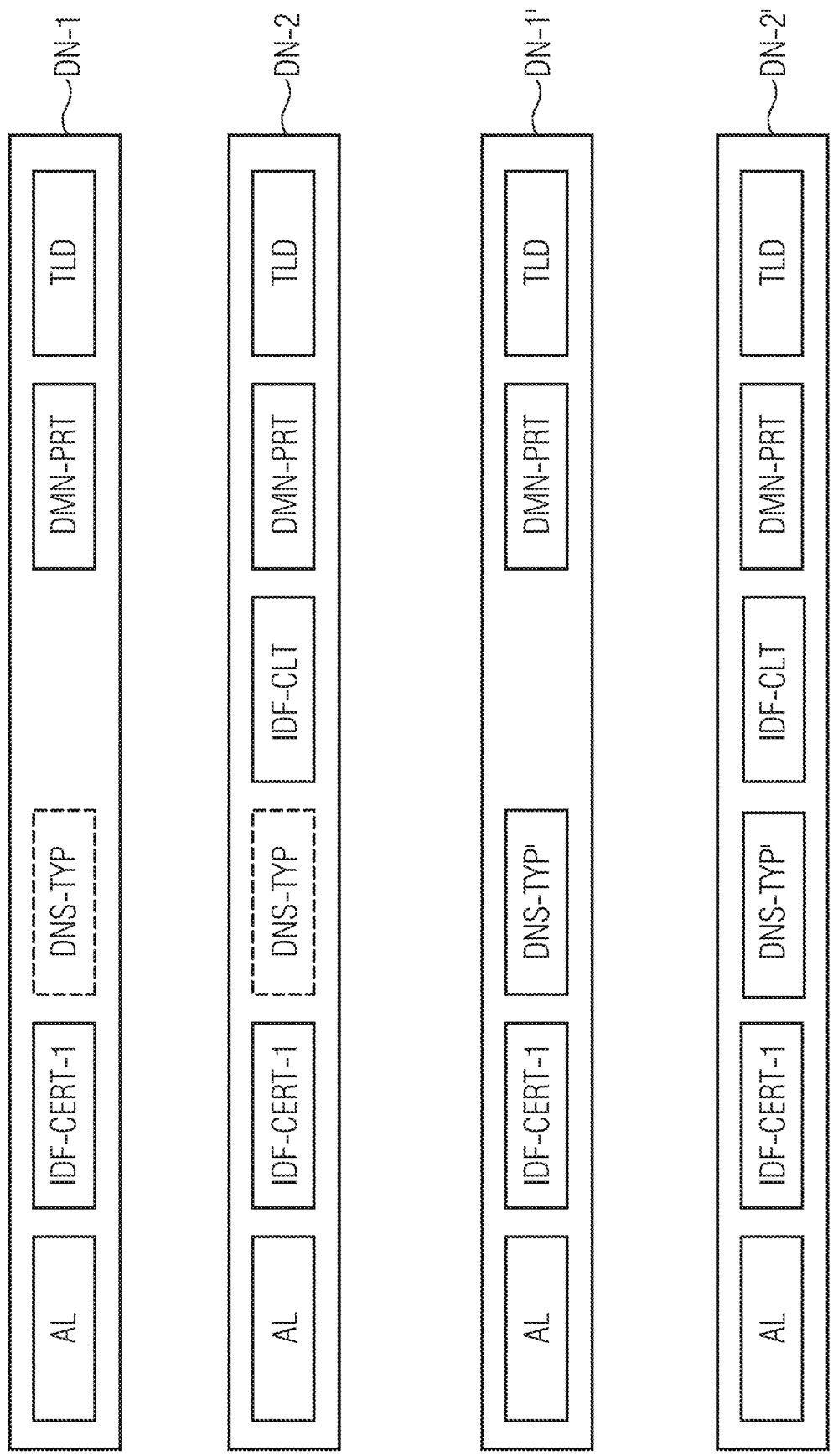
Figure 17:
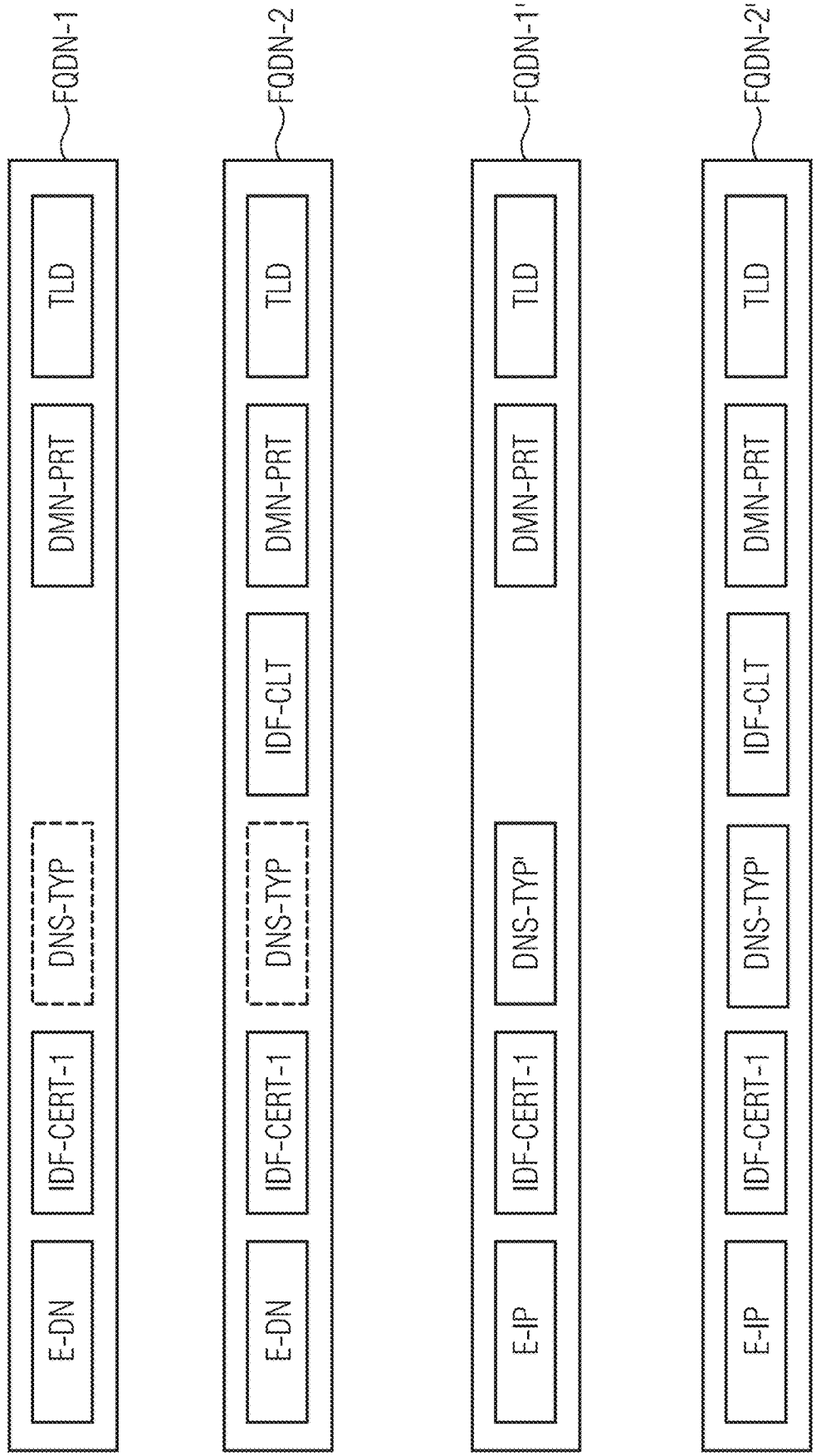
Figure 18:
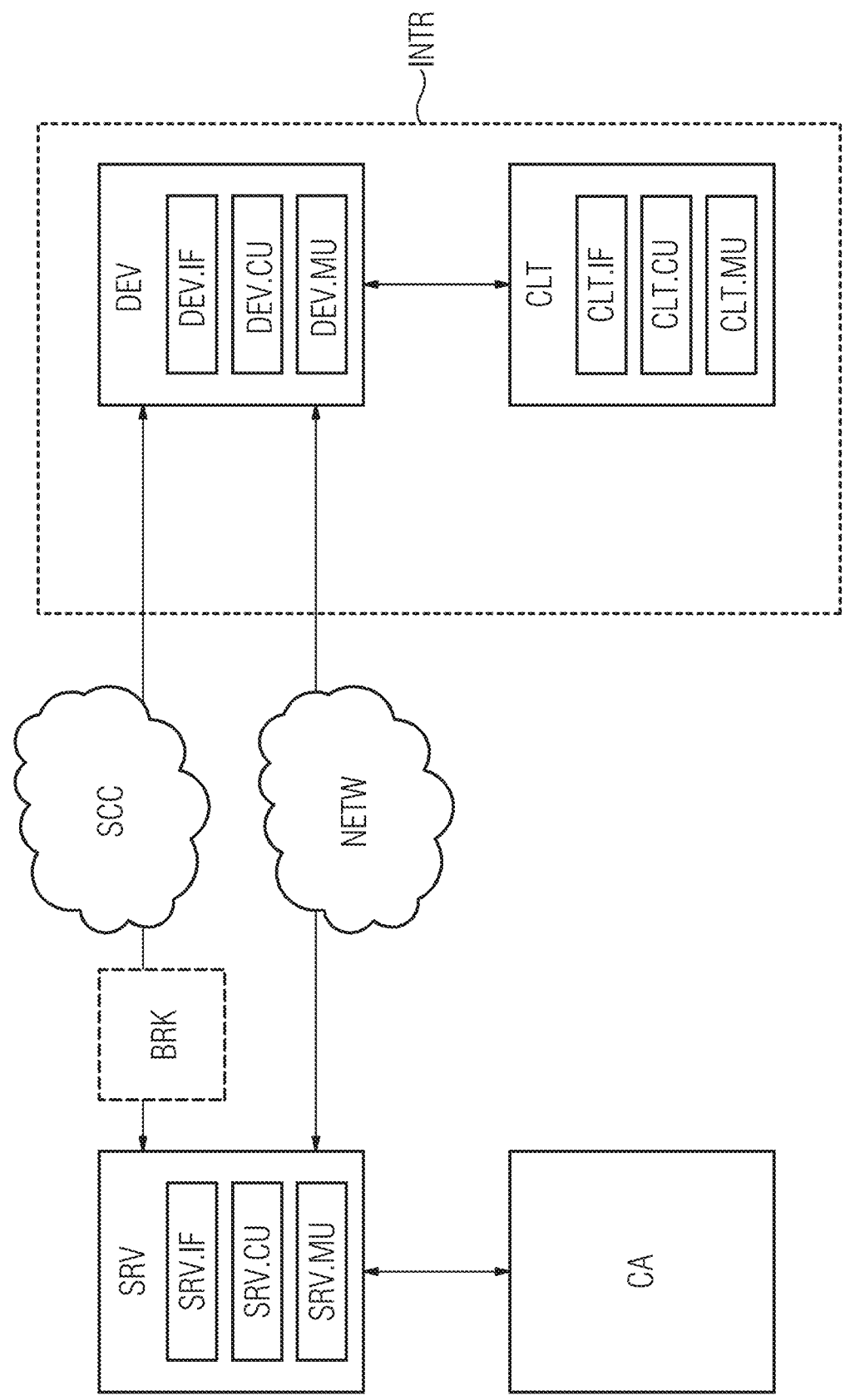
Figure 19:
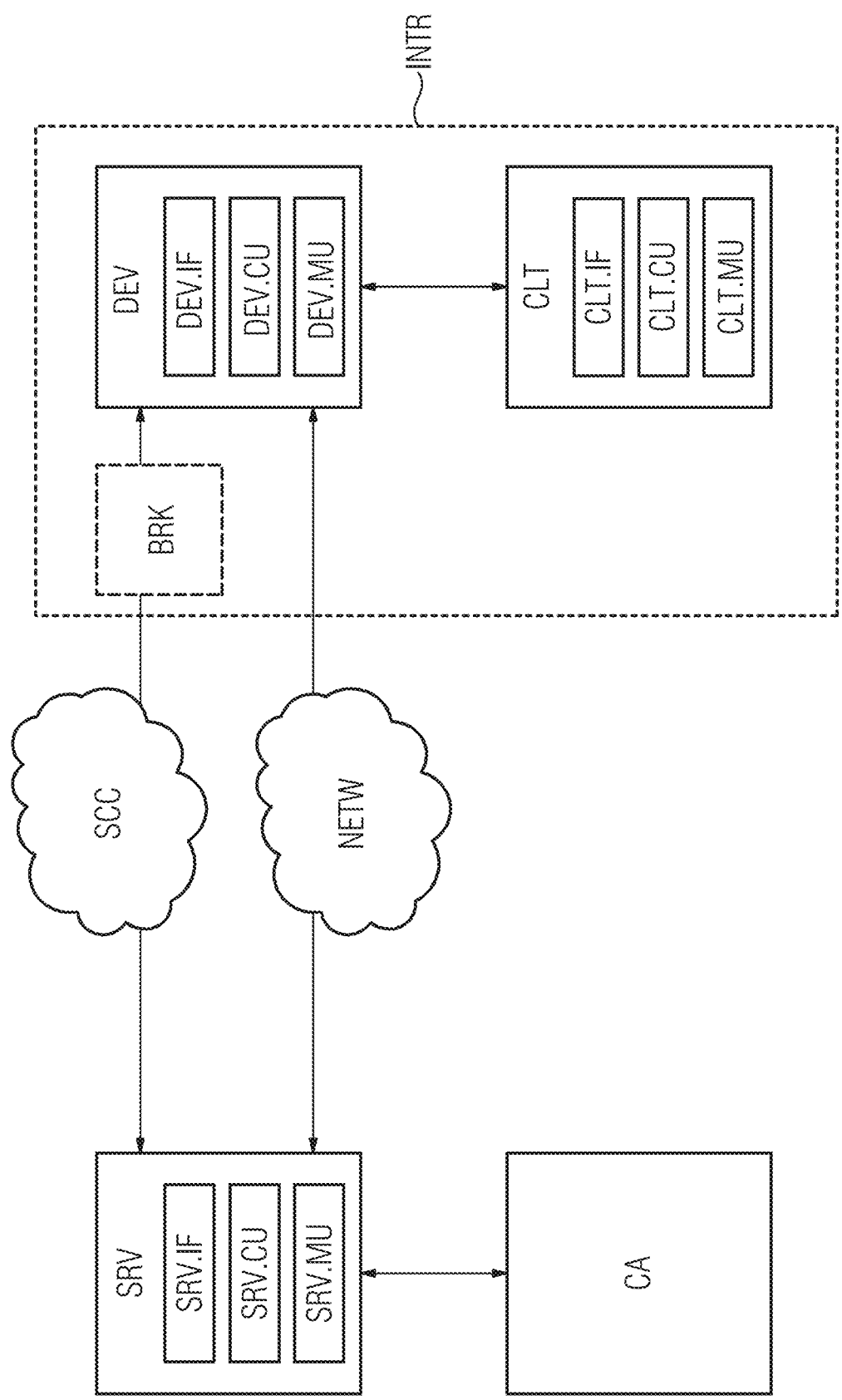
Figure 20:
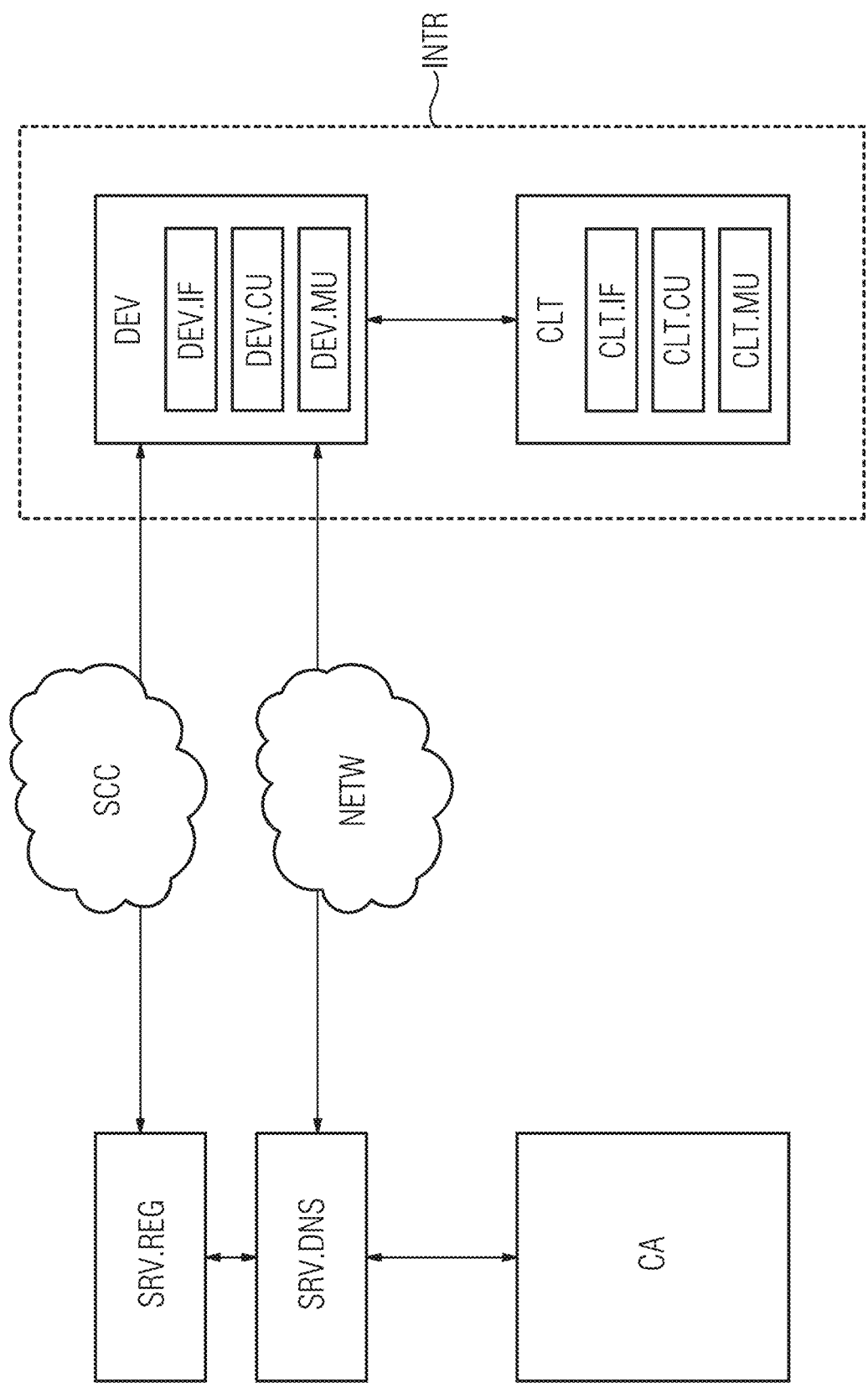

In the following:

FIG. 1 displays a first data flow diagram for a method for providing a first digital certificate according to an embodiment of the invention, FIG. 2 displays a modified first data flow diagram for a method for providing a first digital certificate according to an embodiment of the invention, FIG. 3 displays a second data flow diagram for a method for providing a first digital certificate according to an embodiment of the invention, or for a method for providing a second digital certificate according to an embodiment of the invention, FIG. 4 displays a first process flow diagram of a method for providing a first digital certificate according to an embodiment of the invention, FIG. 5 displays a second process flow diagram of a method for providing a first digital certificate according to an embodiment of the invention, FIG. 6 displays a process flow diagram of a method for installing a first digital certificate according to an embodiment of the invention, FIG. 7 displays a third process flow diagram of a method for providing a first digital certificate according to an embodiment of the invention, FIG. 8 displays a fourth process flow diagram of a method for providing a first digital certificate according to an embodiment of the invention, FIG. 9 displays a process flow diagram of a method for providing a second digital certificate according to an embodiment of the invention, FIG. 10 displays a process flow diagram of a method for installing a second digital certificate according to an embodiment of the invention, FIG. 11 displays a fifth process flow diagram of a method for providing a first digital certificate according to an embodiment of the invention, FIG. 12 displays a data flow diagram for a method for providing a DNS response according to an embodiment of the invention, FIG. 13 displays a first process flow diagram of a method for providing a DNS response according to an embodiment of the invention, FIG. 14 displays a second process flow diagram of a method for providing a DNS response according to an embodiment of the invention, FIG. 15 displays a third process flow diagram of a method for providing a DNS response according to an embodiment of the invention, FIG. 16 displays domain names used in different embodiments of the invention, FIG. 17 displays fully qualified domain names used in different embodiments of the invention, FIG. 18 displays a first embodiment of a server, a device, a certificate authority, and a client according to an embodiment of the invention, FIG. 19 displays a second embodiment of a server, a device, a certificate authority, and a client according to an embodiment of the invention, FIG. 20 displays a third embodiment of a server, a device, a certificate authority, and a client according to an embodiment of the invention.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In one embodiment, the invention relates to a computer-implemented method for providing a digital certificate to a device. The method is based on receiving, from the device, authentication data via a secure communication channel. In particular, the authentication data can be used for ensuring the identity of the device and the reliability and security of the communication. Furthermore, the method is based on receiving, from the device, or determining, by the server, a first certificate identifier. In particular, the first certificate identifier is a hash value. In other words, either a step of receiving, from the device, the first certificate identifier or the step determining, by the server, the first certificate identifier is executed. Further steps of the method are verifying the authentication data and receiving, from the device, a first public key created by the device.

In at least one embodiment, the method is furthermore based on sending a first certificate signing request related to a first domain name based on the first public key to a certificate authority. Herein, the first domain name comprises the certificate identifier, and a domain related to the first domain name is controlled by the server. In particular, the first domain name is a wildcard domain. In particular, the first domain name comprises the certificate identifier, if the certificate identifier is a substring of the first domain name. Advantageously, the certificate identifier can be identical with exactly one label of the first domain name. In particular, a domain related to the first domain name is controlled by the server, if the domain is at least a subdomain of a domain or equivalent with a domain the server can prove ownership of.

The method is furthermore based on receiving the first digital certificate from the certificate authority, wherein the first digital certificate is a wildcard certificate based on the first domain name and the first public key signed by the certificate authority, providing the first digital certificate to the device.

In particular, the step of receiving the first certificate identifier is executed by a server, in particular, by an interface of the server. In particular, the step of verifying the authentication data is executed by the server, in particular, by a calculation unit of the server. In particular, the step of receiving the first public key is executed by the server, in particular, by the interface of the server. In particular, the step of sending the first certificate signing request is executed by the server, in particular, by the interface of the server. In particular, the step of receiving the first digital certificate is executed by the server, in particular, by the interface of the server. In particular, the step of providing the first digital certificate is executed by the server, in particular, by the interface of the server.

The inventors recognized that based on the proposed method the first digital certificate can be created by the server and provided to the client, so that the client is not involved in the certificate generation process and/or the interaction with the certificate authority. In particular, the server can demonstrate ownership of the first domain name and is eligible to have a digital certificate being created with respect to the first domain name.

At the same time, by using a wildcard certificate related to a domain name with an asterisk (e.g. in the lowest level), additional information can be provided that allows resolving or forwarding requests (e.g., DNS requests) directed to the first domain to the device. For example, an encoded IP address and/or an encoded domain name related to the device can be used replacing the asterisk within a DNS request, so that a DNS response redirecting to the IP address and/or decoded domain name related to the device can be provided based on the additional content that is submitted. In general, DNS is the acronym for "Domain Name System", e.g. specified in the standard RFC 1035 "Domain Names—Specification and Implementation", https://tools.ietf.org/html/rfc1035 or any later standard.

In particular, by using this wildcard certificate, a valid HTTPS communication can be established with the device, even though the first digital certificate is not related to a domain of the device, but to a domain of the server.

Additionally, the wildcard certificate is valid irrespective of which information is used replacing the asterisk, i.e., for every encoded domain name and/or encoded IP address used. However, by using a first certificate identifier related to the device within the certificate, the certificate can only be used for authenticating a specific device, and not another device relating to another first certificate identifier.

As a further advantage, based on using the authentication data and/or the secure communication channel the device can be authenticated by the server without the device already having installed a digital certificate. This allows for providing certificates by the server to a device without being a human interaction for authenticating the device (e.g., via a telephone call).

In particular, a secure communication channel is a communication channel with technical means to prevent that the respective communication is being manipulated and/or overheard. For example, a secure communication channel might be a VPN (acronym for "Virtual Private Network") connection or an SRS (acronym for "Smart Remote Service", a Siemens Healthineers Product).

Asymmetric encryption is based on pairs of keys comprising a public key, which may be disseminated widely, and a private key, which are known only to the owner. In particular, a public key of a receiver can be used for encrypting a message to be sent to the receiver, wherein the encrypted message can only be decrypted based on the private key. Furthermore, a private key of a sender can be used for signing a message to be transmitted, thereby proving authorship, wherein the signature can be verified based on the public key of the sender.

In particular, a domain name is an identification string that defines a realm of administrative autonomy, authority or control within the Internet. In particular, a domain name identifies a network domain or a resource in the internet (associated with an IP address), e.g. a server or a webservice.

In particular, a domain name comprises an ordered set of labels (the term "level" can be used as synonym for the term "label"), each of them separated by a special character (a dot "."). The right-most level is denoted as top-level and can be a country top-level (e.g. "de", "uk", "nl") or a generic top-level (e.g. "com", "org", "net").

A domain name can comprise an asterisk (the character "*"). Such a domain name can be denoted as wildcard domain name. A wildcard domain name is a representative for a larger set of domain names, wherein each domain name in the larger set of domain names replaces the asterisk character with a string or a label.

A fully qualified domain name (acronym "FQDN") is a domain name that is completely specified with all labels in the hierarchy of the domain name system, having no parts omitted. In particular, a fully qualified domain name can be resolved by a DNS-server (acronym for "domain name system"). In particular, a fully qualified domain name does not comprise a wildcard.

A fully qualified domain name is denoted to specify a certain domain name, if the domain name is a wildcard domain name and if the fully qualified domain name can be created from the domain name by replacing the asterisk with a string or a label. Vice versa, a wildcard domain name is denoted to represent a certain domain name, if the domain name is a fully qualified domain name specifying the wildcard domain name.

In particular, a digital certificate is an electronic document that can be used to prove the ownership of a public key. The terms "public key certificate" and "identity certificate" can be used as synonyms for the term "digital certificate". In particular, a digital certificate comprises the public key and/or information about the public key, the subject of the digital certificate, and a digital signature of the issuer. In particular, the subject of the digital certificate can be the owner of the digital certificate and/or information related to the owner of the digital certificate. In particular, the issuer is an entity that has verified the certificate's contents. In particular, the issuer can be a certificate authority.

In particular, the digital certificate can be an X.509 certificate. The digital certificate being a X.509 certificate means that the digital certificate conforms to the X.509 standard.

In particular, the digital certificate can be a TLS (acronym for "Transport Layer Security") or an SSL (acronym for "Secure Sockets Layer") server certificate. In particular, the subject of a TLS or SSL server certificate is a hostname and/or a domain name. In the following, the term "server certificate" can be used as synonym for the term "TLS or SSL server certificate".

In particular, a wildcard digital certificate is a server certificate with an asterisk within the hostname and/or the domain name. In particular, the asterisk can be replaced with any other valid string. For example, a wildcard digital certificate with the subject "*.example.com" is also valid for "abc.example.com" and "def.example.com".

In particular, a certificate identifier is a string that can be used to identify a certain certificate or a group of certain certificates. In particular, a certificate identifier can be a unique certificate identifier, so that for one unique certificate identifiers there is not more than one (non-withdrawn) certificate identified by the unique certificate identifier. In particular, the certificate identifier can be a hash value. Alternatively, the certificate identifier can be based on public available information of the subject of the certificate (e.g., based on a material number and/or a serial number of a device authorized by the certificate). Certificates can be withdrawn under certain circumstances, e.g. after a certain amount of time or if they are compromised by the respective private key becoming public. In these situations, a new certificate based on a new pair of public and private keys is created, e.g. based on the methods according to the invention. Such a new certificate can be based on the same certificate identifier as the previous, withdrawn certificate. This has the advantage that domain names stored in other communicating devices do not need to be changed.

In particular, a certificate signing request is a dataset sent to a certificate authority (in a public key infrastructure) in order to apply for a digital certificate. In particular, a certificate signing request comprises a public key for which the digital certificate should be issued, identifying information (e.g., a domain name) and integrity protection (e.g., a digital signature). Certificate singing requests can be based on the RFC 2968 standard ("PKCS #10: Certification Request Syntax Specification", https://tools.ietf.org/html/rfc2986") or the "Signed Public Key and Challenge" standard (acronym SPKAC).

In particular, a hash value is the result of the application of a hash function on a dataset. In particular, the hash function can take additional arguments, for example a seed.

In general, a hash function is a function that maps data of arbitrary size to data of a fixed size. In particular, the hash function is a cryptographic hash function. In particular, a cryptographic hash function is a deterministic function; in particular the output of the hash function does only depend on the input of the hash function. In particular, a cryptographic hash function can be calculated in a fast manner for all input values. In particular, a cryptographic hash function is only brute-force invertible, i.e. given the output of a cryptographic hash function it is only possible to calculate the corresponding input of the cryptographic hash function by calculating the cryptographic hash function for an large amount of input values (i.e. a brute-force attack). In other words, finding the input value corresponding to the output value of a cryptographic hash function is an intractable problem. In particular, finding a first input value and a second input value of a cryptographic hash function that lead to an identical output value is an intractable problem.

According to a further embodiment of the invention the first domain name comprises an asterisk label, wherein the asterisk label is the last label of the first domain name, and wherein the first certificate identifier is a label of the first domain name different from the last label of the first domain name, in particular, wherein the first certificate identifier is the second last label of the first domain name.

The inventors recognized that by using the asterisk label as the last label of the first domain a single DNS entry can be used for forwarding or sending information to the device. If using the first certificate identifier as the second last label of the first domain name, it is possible to use only a single DNS entry for several certificates for several clients, because an asterisk in a DNS entry (in particular, an asterisk in a resource record of the DNS entry) can represent all possible first certificate identifiers.

According to a further embodiment of the invention, the method comprises proving ownership of the domain related to the first domain name. In particular, this step is executed by the server, in particular, by the interface and/or the calculation unit of the server.

In particular, the step of proving ownership can comprise at least one of the following substeps:
  receiving a challenge from the certificate authority,
  determining a response related to the challenge, wherein the response demonstrates control over the domain related to the first domain name,
  providing the response to the certificate authority,
  informing the certificate authority that the response has been provided.

The inventors recognized that by proving the ownership by the server such a proof does not need to be implemented by the device itself. In particular, by executing the proving centrally at the server for a potential plurality of devices, operation and maintenance of the overall system can be executed more efficiently.

According to a further embodiment of the invention, the authentication data comprises a pre-shared secret. In particular, the pre-shared secret can be based on at least one of a pre-shared one-time password, a pre-shared key and/or a pre-shared hardware token. In particular, the pre-shared secret can be installed on the device during manufacturing and/or during installation of the device.

In particular, shared secret is a piece of data, known only to the parties involved, in a secure communication, shared beforehand between the communicating parties. A pre-shared one-time password can be a string (also denoted as "passphrase"), a number or an array of numbers (in particular, an array of bits or bytes). The pre-shared one-time password can be directly distributed between the communication partners for authenticating one of the communication partners. Alternatively, the pre-shared one-time password can be used to determine other data to be exchanged between the communication partners (e.g. used as a basis for a hash value). A pre-shared one-time key can be a symmetric or asymmetric key usable for encrypting and/or decrypting the communication between communication partners.

In particular, a hardware token stores a secret information that can be used to prove identity. A hardware token can be a static password token, wherein the static password token contains a password which is physically hidden (not visible to the possessor of the static password token), but which is transmitted for each authentication. A hardware token can be a synchronous dynamic password token, wherein within the synchronous dynamic password token timer is used to rotate through various combinations produced by a cryptographic algorithm. A hardware token can be an asynchronous password token, wherein within the asynchronous password token a one-time password is generated without the use of a clock, either from a one-time pad or cryptographic algorithm. A hardware token can be a challenge response token, wherein the server encrypts a challenge (typically a random number, or at least data with some random parts) with a public key, and the device connected with the challenge response token and/or the challenge response token itself proves it possesses a copy of the matching private key by providing the decrypted challenge.

The inventors recognized that based on a pre-shared secret a secure communication can be established, resulting in the fact that only an eligible device can receive a first digital certificate. In particular, interference by a third party into this process can be detected and prevented. In particular, by using a pre-shared hardware token, the pre-shared secret cannot even be extracted by the physical owner of the device, so that also non-compliant behavior of the owner can be prevented.

According to a further embodiment of the invention, the authentication data comprises a device identifier of the device, in particular, wherein the device identifier is based on a material number of the device and/or a serial number of the device. In particular, a device identifier is a unique device identifier, implying that there is a one-to-one correspondence between the device and the respective device identifier. In particular, the combination of the material number of the device and the serial number of the device is a unique device identifier.

The inventors recognized that by using a device identifier the provided digital certificate can be assigned to the device. Furthermore, by using the device identifier in the authentication data the security of the method can be increased, because it enables the server to only issue certificates for known devices. In particular, if the authentication data comprises both the device identifier and a pre-shared secret, the security of the method can be increased even further, because it enables the server to only issue certificates for known devices that store the pre-shared secret.

According to a further embodiment of the invention, the method furthermore comprises sending a modified first certificate signing request related to a modified first domain name based on the first public key to the certificate authority, wherein the modified first domain name comprises the certificate identifier. A further step is receiving a modified first digital certificate from the certificate authority, wherein the modified first digital certificate is a wildcard certificate based on the modified first domain name and the first public key signed by the certificate authority. A further step is providing the modified first digital certificate to the device.

In particular, the modified first domain name distinguishes from the first domain name in exactly one label, either by the modified first domain name comprising an additional label, or by exactly one of the labels of the modified first domain name being different from the corresponding label of the first domain name.

In particular, the first domain name can be used related to DNS A or AAAA resource records, and the modified domain name can be used related to DNS CNAME resource record, or vice versa. In particular, a DNS A resource record resolves a DNS request to an IPv4 address (acronym for "Internet Protocol, Version 4"), and a DNS AAAA resource record resolves a DNS request to an IPv6 address (acronym for "Internet Protocol, Version 6"). In particular, a DNS CNAME resource record resolves a DNS request to another domain name (in other words, it can be interpreted as referral).

The inventors recognized that by issuing a modified first digital certificate in addition to a first digital certificate, based on the domain name used in communication (e.g., in DNS requests), it can be determined solely based on the domain name what the expected reaction to the communication is. For example, based on the domain name it can be decided whether the sender of a DNS requests expects as a result an A/AAAA resource record or a CNAME resource record.

According to a further embodiment of the invention, the method comprises creating a DNS resource record for the first domain name and/or for the modified first domain name. In particular, the method can comprise creating a first DNS A resource record or an AAAA resource record for the first domain name and a DNS CNAME resource record for the modified first domain name, or creating a first DNS A resource record or an AAAA resource record for the modified first domain name and a DNS CNAME resource record for the first domain name. In particular, the DNS resource record can be a wildcard resource record. In particular, the DNS resource record can be stored in a zone file. In particular, a DNS resource record can comprise type, an expiration time, a class, and type-specific data.

The inventors recognized that by creating a DNS resource record communication directed to the service based on the first domain name and/of on the modified first domain name can be enabled.

According to a further embodiment of the invention, the method furthermore comprises storing a usage information related to the authentication data to prevent re-using the authentication data. In particular, usage information can be stored by storing the authentication data in a database, wherein the database is checked in the step of validating the authentication data to determine whether the authentication data is already in the database. Alternatively, usage information can be stored by storing a flag related to the authentication data in a database of all authentication data that indicates that a certain authentication data already has been used. The flag can then by checked in the step of validation the authentication data to determine whether the authentication data has already been used.

The inventors recognized that based on the usage information stored using the same authentication data twice can be prevented. This increases the safety of the system by not allowing to have two digital certificates issued for the same set of authentication data.

According to a further embodiment of the invention, the method furthermore comprises an optional step of authenticating the device based on the first digital certificate. Furthermore, the method comprises receiving registration data from the device, wherein the registration data comprise a second certificate identifier and receiving a second public key created by a client of the device. In particular, the registration data can comprise additional data, e.g. a token provided from the device to the client.

Furthermore, the method comprises sending a second certificate signing request related to a second domain name based on the second public key to the certificate authority, wherein the second domain name comprises the second certificate identifier, and receiving a second digital certificate from the certificate authority, wherein the second digital certificate is a wildcard certificate based on the second domain name signed by the certificate authority. The method furthermore comprises providing the second digital certificate to the device and/or to the client.

In particular, the described additional steps of the method can be executed after providing the first digital certificate, and in particular, they can be executed some longer timespan after providing the first digital certificate.

The inventors recognized that based on these additional steps an second digital certificate can be created for a client that is trusted by the device or authenticated at the device, without an direct interaction between the server and the client. In particular, in this process, the first digital certificate can be used by the device to authenticate at the server. By using this method, it is for example not necessary to have a pre-shared secret at the client for authentication. If the pre-shared secrets within the previously described methods are already included during the manufacturing of the device (wherein manufacturing can comprise compiling certain code at the server side), digital certificates can be distributed to clients even if one has no access to the clients during the manufacturing. For example, a vendor could use this method to distribute digital certificates to third-party clients.

According to a further embodiment of the invention, the second certificate identifier comprises the first certificate identifier and a client identifier related to the client.

The inventors recognized that by using a second certificate identifier based on the first certificate identifier and the client identifier both the respective first digital certificate of the device (and potentially having been used to authenticate the device for creating the second digital certificate) and the respective client can be identified alone based on the second certificate identifier. This can be useful in situations where the second digital certificate has been corrupted and needs to be revoked, or to identify misappropriate use by a user of the device.

According to a further embodiment of the invention, the second domain name comprises an asterisk label, wherein the asterisk label is the last label of the second domain name, wherein the first certificate identifier is the second last label of the second domain name, and wherein the client identifier is the third last label of the second domain name. According to an alternative embodiment of the invention, the second domain name comprises an asterisk label, wherein the asterisk label is the last label of the second domain name, wherein the client identifier is the second last label of the second domain name, and wherein the first certificate identifier is the third last label of the second domain name.

The inventors recognized that by using the first certificate identifier and the client identifier in the presented name within the second domain name, the structure of devices and clients of these devices can be represented within the second domain names. Such a structure in the domain names can be preferably used by geographically distributing servers according to the location of the respective devices, in order to ensure fast response times, by using a structure of the DNS resource records related to the defined structure of the domain names.

According to a further embodiment of the invention, the method comprises creating a DICOM node configuration based on the first digital certificate and/or the second digital certificate. The step of creating a DICOM node configuration can be executed by the server, by the device and/or by the client.

In particular, creating a DICOM node configuration can comprise creating an entry corresponding to the device and/or the client in a DICOM configuration for enabling encrypted communication based on the first digital certificate and/or the second digital certificate.

The inventors recognized that by creating a DICOM node configuration based on the first digital certificate and/or the second digital certificate an encrypted DICOM communication between several DICOM nodes can be established.

The invention relates in another embodiment to a computer-implemented method for providing a DNS response. This method is based on receiving, from a requestor, an DNS request for resolving a fully qualified domain name, wherein the fully qualified domain name comprises as a label an encoded domain name. The method furthermore comprises determining a decoded domain name based on the encoded domain name, and providing, to the requestor, a DNS response, wherein the DNS response comprises the decoded domain name. In particular, the DNS response comprise a CNAME resource record based on the decoded domain name.

In particular, the method for providing a DNS response is executed by a server. In particular, the step of receiving the DNS request and the step of providing the DNS response are executed by an interface, in particular, by an interface of the server. In particular, the step of determining the decoded domain name is executed by a computation unit, in particular by a computation unit of the server.

In particular, an encoded domain name is a domain name where special characters in the DNS system are replaced by one or more masking characters. In particular, an encoded domain name cannot be used directly within the DNS system as basis for a valid DNS request. In particular, an encoded domain name can be used as single label or single level within a fully qualified domain name.

An example for a special character in the DNS system is the dot "." separating different levels or labels of a domain name. In particular, the encoded domain name is a domain name where every dot "." has been replaced by the characters "--" (double dash) or "---" (triple dash).

A decoded domain name is based on an encoded domain name. In particular, the decoded domain name can be determined based on the encoded domain name by replacing the one or more masking characters within the encoded domain name with the corresponding special characters within the DNS system. In particular, a decoded domain name can be used directly within the DNS system as basis for a valid DNS request.

The inventors recognized that by using the described method a DNS request directed to a fully qualified domain name comprising an encoded domain can be resolved to a decoded domain. In particular, the fully qualified domain name can relate to another server than the decoded domain, and the decoded domain does not need to be a publicly resolvable domain, but can correspond to a local domain only resolvable in an internal network. Furthermore, by using this method a secure communication can be issued based on a digital certificate issued based on the fully qualified domain name, but the communication then being directed to the (potentially local) decoded domain name.

In the alternative, it would also be possible to use an encoded IP address and a decoded IP address instead of the encoded domain name and the decoded domain name. However, using encoded and decoded domain names has the advantage that in the (potentially local) network related to the decoded domain names no static IP addresses have to be used.

According to a further embodiment of the invention, the fully qualified domain name can comprise as alternative to the encoded domain name an encoded IP address. In this embodiment, the method for providing a DNS response furthermore comprises determining, based on the fully qualified domain name, whether DNS request is related to an A resource record, to an AAAA resource record or to a CNAME resource record. If the determining results in the case that the DNS request is related to a CNAME resource record, the the decoded domain name is determined based on the encoded domain name and the DNS response will be provided to the requestor, wherein the DNS response comprises the CNAME resource record, and wherein the DNS response comprises the decoded domain name. If the determining results in the case that the DNS request is related to an A resource record or an AAAA resource record, a decoded IP address is determined based on the encoded IP address and the DNS response will be provided to the requestor, wherein the DNS response comprises the A resource record or the AAAA resource record, and wherein the DNS response comprises the decoded IP address.

In particular, an encoded IP address is an IP address where special characters in the DNS system and/or the TCP/IP system are replaced by one or more masking characters. In particular, an encoded IP address cannot be used directly within the TCP/IP system as basis for a valid TCP/IP request (e.g. a valid HTTP or HTTPS request). In particular, an encoded IP address can be used as single label or single level within a fully qualified domain name.

An example for a special character in the DNS system is the dot "." separating different levels or labels of a domain name, and also separating different components of an IP address (within the IPv4 standard). In particular, the encoded IP address is an IP address where every dot "." has been replaced by the character "-" (dash), the characters "--" (double dash) or the characters "---" (triple dash). Within the IPv6 standard, the special character ":" could be replaced in a similar fashion if necessary.

A decoded IP address is based on an encoded IP address. In particular, the decoded IP address can be determined based on the encoded IP address by replacing the one or more masking characters within the encoded IP address with the corresponding special characters within the DNS system and/or the TCP/IP system. In particular, a decoded IP address can be used directly within the TCP/IP system as basis for a valid TCP/IP request (e.g. a valid HTTP or HTTPS request).

The inventors recognized that based on the proposed method both requests directed to a domain name (resulting in an CNAME resource record) and to an IP address (resulting in an A resource record or an AAAA resource record) can be handled. By basing the determination on which resource record is requested on the fully qualified domain name the encoded domain name and/or the encoded IP address do not need to be inspected for their type, which is a possibly erroneous step. Furthermore, by the determining ambiguities (in the case a label in the fully qualified domain name can correspond to both an encoded IP address and an encoded domain name) can be handled by the method.

According to a further possible embodiment the step of determining whether the DNS request is related to an A resource record, to an AAAA resource record or to a CNAME resource record, is based on the existence and/or the content of a label not being the lowest label of the fully qualified domain name. In the alternative, the step is based on the content of the lowest label of the fully qualified domain name.

The inventors recognized that by basing the determination on a label not being the lowest label wildcard domain names can be used more easily in the DNS system. By basing the determination on a label being the lowest label, only a defined part of the fully qualified domain name has to be inspected, and not the whole fully qualified domain name.

The invention relates in another embodiment to a server for providing a first digital certificate to a device, comprising an interface and a computation unit,
configured for receiving, from the device, authentication data via a secure communication channel,
configured for receiving, from the device, or determining, by the server, a first certificate identifier, in particular, wherein the first certificate identifier is a hash value or random value,
configured for verifying the authentication data,
configured for receiving, from the device, a first public key created by the device,
configured for sending a first certificate signing request related to a first domain name based on the first public key to a certificate authority, wherein the first domain name comprises the certificate identifier,
and wherein a domain related to the first domain name (DN-1) is controlled by the server,
configured for receiving the first digital certificate from the certificate authority,
wherein the first digital certificate is a wildcard certificate based on the first domain name and the first public key signed by the certificate authority,
configured for providing the first digital certificate to the device.

In particular, the server can be configured to execute the method for providing a first digital certificate according to the invention and its embodiments. The server is configured to execute the method and its embodiments by its interface and the computation unit being configured to execute the respective method steps.

The invention relates in another embodiment to a device comprising an interface and a computation unit, configured for:
determining authentication data for authenticating the device at a server,
optionally sending a first certificate identifier to the server, in particular, wherein the first certificate identifier is a hash value or a random value,
creating a first asymmetric key pair, the asymmetric key pair comprising a first public key and a first private key,
sending the first public key to the server,
receiving and installing a first digital certificate on the device.

In particular, the device can be configured to execute the respective steps of the method for providing a first digital certificate according to the invention and its embodiments. The device is configured to execute the method and its embodiments by its interface and the computation unit being configured to execute the respective method steps.

The invention relates in another embodiment to a client comprising an interface and a computation unit, the client being a client of a device, configured for
determining registration data,
sending the registration data to the device,
creating a second asymmetric key pair, the second asymmetric key pair comprising a second public key PBK-1 and a second private key,
sending the second public key to the device, and
receiving and installing a second digital certificate.

In particular, the client can be configured to execute the respective steps of the method for providing a first digital certificate according to the invention and its embodiments.

The client is configured to execute the method and its embodiments by its interface and the computation unit being configured to execute the respective method steps.

The invention relates in another embodiment to a system comprising a server according to the invention and its embodiments, a device according to the invention and its embodiments, and optionally a client according to the invention and its embodiments. In particular, the client and the device are located in an intranet.

The invention relates in another embodiment to a DNS server comprising an interface and a computation unit, configured for:
- receiving, from a requestor, an request for resolving a fully qualified domain name, wherein the fully qualified domain name comprises as a label an encoded domain name,
- determining a decoded domain name based on the encoded domain name, and
- providing, to the requestor, a DNS response, wherein the DNS response comprises the decoded domain name.

In particular, the DNS server can be configured to execute the respective steps of the method for providing a DNS response according to the invention and its embodiments. The DNS server is configured to execute the method and its embodiments by its interface and the computation unit being configured to execute the respective method steps.

The invention relates in another embodiment to a computer program product comprising instructions which, when the program is executed by a computer, cause the computer to carry out one of the methods according to the invention and its embodiments. Furthermore, the invention relates to a computer-readable medium comprising instructions which, when executed by a computer, cause the computer to carry out one of the methods according to the invention and its embodiments.

The realization of the invention or one of its embodiments by a computer program product and/or a computer-readable medium has the advantage that already existing servers, devices and clients can be easily adapted by software updates in order to work as proposed by the invention.

The computer program products can be, for example, a computer program or comprise another element apart from the computer program. This other element can be hardware, for example a memory device, on which the computer program is stored, a hardware key for using the computer program and the like, and/or software, for example a documentation or a software key for using the computer program.

FIG. 1 displays a first data flow diagram for a method for providing a first digital certificate CERT-1 according to an embodiment of the invention. In this embodiment, data is exchanged between a server SRV, a device DEV and a certificate authority CA. Furthermore, in this embodiment the server SRV comprises a broker BRK that can be used for certain parts of the communication of the server SRV.

In this embodiment, the device DEV sends authentication data AD to the server SRV. Here, the authentication data AD comprises a device identifier IDF-DEV of the device DEV and a one-time password OTP. Alternatively, the authentication data AD may comprise other components that allow an authentication of the device DEV with the server SRV. In this embodiment, the device identifier IDF-DEV is based on the material number of the device DEV and/or the serial number of the device DEV. In this embodiment, the device identifier IDF-DEV comprises the material number and/or the serial number as plain text, alternatively, the device identifier IDF-DEV can comprise the material number and/or the serial number in an encoded way, for example, the device identifier IDF-DEV can comprise a hash value based on the material number and/or the serial number.

Furthermore, the device DEV sends a first certificate identifier IDF-CERT-1 to the server SRV. Alternatively, the first certificate identifier IDF-CERT-1 can also be created by the server SRV instead of being received from the device DEV. In this embodiment, the first certificate identifier IDF-CERT-1 is a unique identifier, for example, by being a hash value, for example, based on a random number or based on the material number and/or the serial number of the device DEV. In general, the first certificate identifier IDF-CERT-1 and the device identifier IDF-DEV are different, alternatively the first certificate identifier IDF-CERT-1 and the device identifier IDF-DEV can be identical.

Furthermore, the device sends a first public key PBK-1 to the server. The first public key PBK-1 corresponds to a first private key PRK-1 being stored on the device DEV. The first public key PBK-1 and the first private key PRK-1 form a first asymmetric key pair. The first asymmetric key pair was created by the device DEV. The first private key PRK-1 can be used to prove ownership of any digital certificate based on the first public key PBK-1.

In the displayed embodiment, the first certificate identifier IDF-CERT-1 and the first public key PBK-1 are sent independently from the device DEV to the server SRV. Alternatively, the first certificate identifier IDF-CERT-1 and the first public key PBK-1 can be part of a first certificate signing request CSR-1 created by the device DEV and sent to the server SRV.

In this first data flow diagram, the server SRV sends a first certificate signing request CSR-1 to the certificate authority CA. In this embodiment, the certificate signing request CSR1-1 comprises the first public key PBK-1 and the first domain name DN-1. The first domain name DN-1 comprises an asterisk label AL and the first certificate identifier IDF-CERT-1.

As a response, the certificate authority CA sends a first digital certificate CERT-1 to the server SRV. The first digital certificate CERT-1 comprises the first domain name DN-1, in particular, the first domain name DN-1 is the subject of the first digital certificate CERT-1. Furthermore, the first digital certificate CERT-1 comprises a signature based on the first public key PBK-1 signed with a private key PRK-CA of the certificate authority CA.

The server SRV receives the first digital certificate CERT-1 and send the first digital certificate CERT-1 to the device DEV. Alternatively, the certificate authority CA can directly provide the first digital certificate CERT-1 to the device DEV.

FIG. 2 displays a modified first data flow diagram displayed in FIG. 1, wherein FIG. 2 only displays the data flow between the server SRV and the certificate authority CA.

In contrast to the first data flow diagram, in the modified flow diagram a modified first certificate signing request CSR-1' is sent (in addition to the first certificate signing request CSR-1) from the server SRV to the certificate authority CA, and as a response, the certificate authority CA sends (in addition to the first digital certificate CERT-1) a modified first digital certificate CERT-1' to the server SRV, which can also provided to the device DEV by the server SRV. The modified first certificate signing request CSR-1' and the modified first digital certificate CERT-1' correspond to the same first public key PBK-1 as the first certificate signing request CSR-1 and the first digital certificate CERT-1, but to a modified first domain name DN-1'. In this embodiment, both the modified first domain name DN-1' and the first domain name DN-1 comprise the same first certificate identifier IDF-CERT-1.

Two first digital certificates CERT-1, CERT-1' for the same device DEV' are needed due to the fact that in general wildcard certificates are only accepted for a single level of the domain name, and that a DNS request to a wildcard domain can only be answered consistently only be a CNAME resource record (corresponding to a domain name) or by an A resource record (corresponding to an IP address), not by both. In general, a domain name server synthesizes an answer to a query based on the query type. A resolver will always ask for an A or AAAA resource record. If the server responds with a CNAME resource request, then the resolver follows the domain in the response until it receives the A or AAAA resource record. Therefore, the domain name spaces for answers that shall be CNAMEs must be separated from answers that shall be A or AAAA records.

FIG. 3 displays a second data flow diagram for a method for providing a first digital certificate CERT-1 according to an embodiment of the invention, or for a method for providing a second digital certificate CERT-1 according to an embodiment of the invention. In this embodiment, data is exchanged between a server SRV, a device DEV, a client CLT related to the device DEV and a certificate authority CA.

The data flow according to the second data flow diagram can occur in connection with the data flow displayed in the first data flow diagram of FIG. 1 and/or the modified first data flow diagram of FIG. 2, or it can be a stand-alone data flow independent of the data flow displayed in the first data flow diagram of FIG. 1 and/or the modified first data flow diagram of FIG. 2.

For this data flow diagram, one can assume that the client CLT is authenticated and authorized to interact with the device DEV, and the device DEV is authenticated and authorized to interact with the server SRV, for example, via the first digital certificate CERT-1 and/or the modified first digital certificate CERT-1'.

In the displayed data flow diagram, the client CLT sends a second certificate identifier IDF-CERT-2 to the device DEV. Alternatively, the device DEV and/or the server SRV can create the second certificate identifier IDF-CERT-2, for example, being a hash value. In particular, the device DEV and/or the server SRV can create the second certificate identifier IDF-CERT-2 based on a client identifier IDF-CLT of the client CLT and on the first certificate identifier IDFCERT-1. In particular, the second certificate identifier IDFCERT-2 can comprise both the client identifier IDF-CLT and the first certificate identifier IDF-CERT-1. For example, the client identifier IDF-CLT can be a material number and/or a serial number of the client CLT, or a hostname of the client CLT in a local network environment both the client CLT and the device DEV operate in, or a hash value based on those input values. The second certificate identifier IDF-CERT-2 can be identical with the client identifier IDF-CLT. In particular, the first certificate identifier IDF-CERT-1 and the second certificate identifier IDF-CERT-2 are different. It is also possible that the client CLT receives from the device DEV a token that can be used for the client CLT to interact directly with the server SRV.

Furthermore, the client CLT sends a second public key PBK-2 to the server SRV, directly or indirectly via the device DEV. The second public key PBK-2 corresponds to a second private key PRK-2 being stored on the client CLT. The second public key PBK-2 and the second private key PRK-2 form a second asymmetric key pair. The second asymmetric key pair was created by the client CLT. The second private key PRK-2 can be used to prove ownership of any digital certificate based on the second public key PBK-2.

In the displayed embodiment, the second certificate identifier IDF-CERT-2 and the second public key PBK-2 are sent independently from the client CLT via the device DEV to the server SRV. Furthermore, the second certificate identifier IDF-CERT-2 is part of registration data RD. In particular, the registration data RD can be identical with the second certificate identifier IDF-CERT-2, alternatively, the registration data RD can comprise the second certificate identifier IDF-CERT-2 and additional data. In particular, this additional data can relate to an authentication of the device DEV with the client. In particular, the registration data RD can comprise both the second certificate identifier IDF-CERT-2 and the second public key PBK-2.

Alternatively, the second certificate identifier IDFCERT-2 and the second public key PBK-2 can be part of a second certificate signing request CSR-2 created by the device DEV and/or the client and sent to the server SRV. In particular, the registration data RD can comprise this second certificate signing request CSR-2 or be identical with this second certificate signing request CSR-2.

In this second data flow diagram, the server SRV sends a second certificate signing request CSR-2 to the certificate authority CA. In this embodiment, the second certificate signing request CSR-2 comprises the second public key PBK-2 and the second domain name DN-2. The second domain name DN-2 comprises an asterisk label AL and the second certificate identifier IDF-CERT-2.

As a response, the certificate authority CA sends a second digital certificate CERT-2 to the server SRV. The second digital certificate CERT-2 comprises the second domain name DN-2, in particular, the second domain name DN-2 is the subject of the second digital certificate CERT-2. Furthermore, the second digital certificate CERT-2 comprises a signature based on the second public key PBK-2 signed with the private key PRK-CA of the certificate authority CA.

The server SRV receives the second digital certificate CERT-2 and sends the second digital certificate CERT-2 to the device DEV and/or the client CLT. Alternatively, the certificate authority CA can directly provide the second digital certificate CERT-2 to the client CLT, either directly or via the device DEV.

FIG. 4 displays a first process flow diagram according to an embodiment of the method for providing, by a server SRV, a first digital certificate CERT-1 to a device DEV. The first process flow diagram corresponds to the first data flow diagram displayed in FIG. 1.

The initial steps of the method are receiving REC-AD, from the device DEV, authentication data AD via a secure communication channel and receiving REC-PBK-1, from the device DEV, a first public key PBK-1 created by the device DEV. In this embodiment, the authentication data comprises a client identifier IDF-CLT and a one-time-password OTP. In particular, the client identifier IDF-CLT is based on a material number and/or serial number of the client CLT. In particular, the client identifier IDF-CLT and/or the one-time password OTP could have been stored on the device already at the manufacturing site.

A further step is verifying VRF-AD the authentication data AD. In this embodiment, VRF-AD the authentication data AD comprises checking whether a device database stores the client identifier IDF-CLT in relation to the one-time password OTP. Optionally, a flag within this database can be checked, wherein the flag indicates whether the combination of the client identifier IDF-CLT and the one-time password have already been used in authentication data AD received before. If the step of verifying VRF-AD has a positive outcome, the method will be continued, otherwise the further execution of the method will be stopped.

The method furthermore comprises either the step of receiving REC-IDF-CERT, from the device DEV, a first certificate identifier IDF-CERT-1 or the step of determining DET-IDF-CERT, by the server, the first certificate identifier IDF-CERT-1. In this embodiment, the first certificate identifier IDF-CERT-1 corresponds to a hash value, the hash value being based on a random number. Alternatively, the first certificate identifier IDF-CERT-1 can be based on a client identifier IDF-CLT of the client CLT or on the hash of the client identifier IDF-CLT. In the following it will be assumed that the first certificate identifier IDF-CERT-1 is the string "ca1d5f5f7ba45".

A further step of the displayed embodiment is sending SND-CSR-1 a first certificate signing request CSR-1 related to a first domain name DN-1 based on the first public key PBK-1 to a certificate authority CA, wherein the first domain name DN-1 comprises the certificate identifier IDF-CERT-1. In the following, it will be assumed that the first domain name DN-1 is the string "*.ca1d5f5f7ba45 . . . com". In particular, the first domain name DN-1 is a wildcard domain name. In this embodiment, the domain name comprises five levels: The first level (also denoted as top-level) is the label "com", the second level and the third level are "example" and "cert", the second last level is the certificate identifier IDF-CERT1, and the last level is the asterisk character "*".

The displayed method furthermore comprises the step of receiving REC-CERT-1 the first digital certificate CERT-1 from the certificate authority CA, wherein the first digital certificate CERT-1 is a wildcard certificate based on the first domain name DN-1 and the first public key PBK-1 signed by the certificate authority CA. In this embodiment, the subject of the first digital certificate CERT-1 is equivalent to the first domain name DN-1, in this example "*.ca1d5f5f7ba45 . . . com".

The last step of the displayed method is providing PROV-CERT-1 the first digital certificate CERT-1 to the device DEV. Providing PROV-CERT-1 the first digital certificate CERT-1 can comprise sending the first digital certificate CERT-1 directly to the device DEV and/or enabling the first digital certificate CERT-1 to be downloaded by the device DEV.

FIG. 5 displays a second process flow diagram of a method for providing a first digital certificate CERT-1 according to an embodiment of the invention. The second process flow diagram comprises all steps of the first process flow diagram displayed in FIG. 4, those steps and the data structures described with respect to those steps can comprise all advantageous embodiments and features described in FIG. 4.

The second process flow diagram furthermore comprises the optional step of proving ownership PRV-OWN of the domain related to the first domain name DN-1. In particular, the step of proving ownership PRV-OWN is executed via the ACME protocol (acronym for "Automatic Certificate Management Environment" described in RFC 8555, https://tools.ietf.org/html/rfc8555).

In this embodiment, the step of proving ownership PRV-OWN comprises the substeps of receiving REC-CLG a challenge from the certificate authority CA, determining DET-RSP a response related to the challenge, wherein the response demonstrates control over the domain related to the first domain name DN-1, providing PROV-RSP the response to the certificate authority CA, informing INF-CA the certificate authority CA that the response has been provided.

In this embodiment, the challenge is to create a file with a given content at a certain location at the server being accessible based on the domain "ca1d5f5f7ba45 . . . com", for example a certain HTML file at "http://ca1d5f5f7ba45 . . . com/authentication.html". Determining the response comprises actually creating this file and making it accessible to the public. Alternatively, The ACME method DNS-01 can be used, wherein the challenge needs to be included into a TXT resource record for a specified domain.

In the displayed embodiment, the step of proving ownership PRV-OWN is executed after the step of sending SND-CSR-1 the first certificate signing request CSR-1. It is also possible that first the step of proving ownership PRV-OWN is executed, and afterwards the step of sending SND-CSR-1 the first certificate signing request CSR-1 is executed.

The method according to the process diagram displayed in FIG. 5 furthermore comprises the optional step of creating CRT-DNS a DNS resource record for the first domain name DN-1. A synonym for "DNS resource record" is "resource record". In particular, the DNS resource record is of type "A" (resolving to an IPv4 address), of type "AAAA" (resolving to an IPv6 address) or of type "CNAME" (resolving to another domain name).

The method according to the process diagram displayed in FIG. 5 furthermore comprises the optional step of storing STR-USG a usage information related to the authentication data AD to prevent reusing the authentication data AD. In this embodiment, a flag is stored in the database storing the eligible authentication data AD to indicate that certain authentication data has already been used.

FIG. 6 displays a process flow diagram of a method for installing a first digital certificate CERT-1 according to an embodiment of the invention, According to the displayed embodiment, the method furthermore comprises the step of determining DET-AD, by the device DEV, authentication data for authenticating the device at a server SRV, the step of sending SND-AD, by the device DEV, the authentication data to the server via a secure communication channel, the step of sending SND-IDF-CERT, by the device DEV, a first certificate identifier IDF-CERT-1 to the server SRV, the step of creating CRT-AKP-1, by the device DEV, a first asymmetric key pair, the asymmetric key pair comprising a first public key PBK-1 and a first private key PRK-1, and the step of sending SND-PBK-1, by the device DEV, the first public key PBK-1 to the server SRV. Additionally, the method comprises the step of installing INST-CERT-1, by the device DEV, the first digital certificate CERT-1 on the device DEV.

FIG. 7 displays a third process flow diagram of a method for providing a first digital certificate CERT-1 according to an embodiment of the invention. The third process flow diagram comprises all steps of the first process flow diagram displayed in FIG. 4 and of the second process flow diagram displayed in FIG. 5, those steps and the data structures described with respect to those steps can comprise all advantageous embodiments and features described in FIG. 4 and FIG. 5. Furthermore, the third process flow diagram comprises all steps of the process flow diagram of a method for installing a first digital certificate CERT-1 displayed in FIG. 6, those steps and the data structures described with respect to those steps can comprise all advantageous embodiments and features described in FIG. 6. While FIG. 4 and FIG. 5 describe the steps that are executed by the server SRV, and FIG. 6 describes the corresponding steps that are executed by the device DEV, FIG. 7 also includes the corresponding steps that are executed by the certification authority CA.

In this embodiment, the method furthermore comprises receiving REC-CSR-1, by the certification authority CA, the first certificate signing request CSR-1. Furthermore, the method comprises the step of receiving REC-INF, by the certification authority CA, information that the response has been provided by the server SRV, the step of verifying VRFRSP, by the certification authority CA, the response provided by the server SRV, the step of creating CRT-CERT-1 the first digital certificate based on the first public key PBK-1 and the first domain name DN-1, and the step of sending SND-CERT1, by the certification authority CA, the first digital certificate CERT-1 to the server SRV.

FIG. 8 displays a fourth process flow diagram of a method for providing a first digital certificate CERT-1 according to an embodiment of the invention. The fourth process flow diagram comprises the steps that already have been described with respect to FIG. 4 and FIG. 5. Those steps and the data structures described with respect to those steps can comprise all advantageous embodiments and features described in FIG. 4 and FIG. 5.

The fourth process flow diagram is an extension of the previously described process flow diagrams that allows to distribute additional digital certificates to clients CLT of the device DEC. If creating the first digital certificate CERT-1 is based on a pre-shared secret being stored at the device DEV, this additional process step can be used for providing second digital certificates CERT-2 to a client CLT of the device DEV based on the client CLT being authenticated at and known to the device DEV. In other words, chain of trust is established between the server SRV and the device DEV on the one hand side, and the device DEV and the client CLT on the other hand side. In particular, this can be used if the client CLT is created by a different manufacturer than the owner of the server SRV. In particular, the method steps described in the following can be executed for several clients CLT of the device DEV.

The fourth process flow diagram furthermore comprises the optional step of authenticating AUTH-DEV the device DEV based on the first digital certificate CERT-1. In the embodiment, authenticating AUTH-DEV the device DEV is based on a challenge-response procedure. For example, this can be based on the TLS (acronym for "Transport Layer Security") handshake protocol or other kinds of handshake protocols.

An additional step is receiving REC-RD registration data RD from the device DEV, wherein the registration data RD comprise a second certificate identifier IDF-CERT-2. In this embodiment the second certificate identifier IDF-CERT-2 comprises the first certificate identifier IDF-CERT-1 and a client identifier CLT-IDF of the client CLT. In an alternative embodiment, the second certificate identifier IDF-CERT-2 can be independent of the first certificate identifier IDF-CERT-1 and the identifier CLT-IDF of the client CLT.

A further step is receiving REC-PBK-1 a second public key PBK-2 created by a client CLT of the device DEV. In particular, the second public key PBK-2 corresponds to a second private key PRK-2, the second public key PBK-2 and the second private key PRK-2 being created by the client CLT as a second asymmetric key pair. In particular, the second private key PRK-2 remains on the client CLT and can be used later on to proof the identity of the client CLT based on the second digital certificate.

An additional step of the fourth process flow diagram is sending SND-CSR-2 a second certificate signing request CSR-2 related to a second domain name DN-2 based on the second public key PBK-2 to the certificate authority CA. Here, the second domain name DN-2 comprises the second certificate identifier IDF-CERT-2. In particular, the second domain name DN-2 can be generated based on the first domain name DN-1 by replacing the first certificate identifier IDFCERT-1 within the first domain name DN-1 by the second certificate identifier IDF-CERT-2 (wherein the first certificate identifier IDF-CERT-1 and/or the second certificate identifier IDF-CERT-2 can comprise several labels or levels of a domain name, and in particular, wherein the first certificate identifier IDF-CERT-1 and the second certificate identifier IDF-CERT-2 can comprise a different number of labels or levels of a domain name). Examples of corresponding first domain names DN-1 and second domain names DN-2 are displayed in FIG. 16.

After sending SND-CSR-2 the second certificate signing request CSR-2 to the certificate authority, the process flow comprises receiving REC-CERT-2 a second digital certificate CERT-2 from the certificate authority CA. Here the second digital certificate CERT-2 is a wild-card certificate based on the second domain name DN-2 signed by the certificate authority CA. As for the first certificate signing request CSR-1, there can be additional steps for proving PRV-OWN' similar to the steps displayed in FIG. 5 and FIG. 7.

The last step of the displayed flow diagram is providing PROV-CERT-2 the second digital certificate CERT-2 to the device DEV and/or to the client CLT. In particular, the second digital certificate CERT-2 can be sent directly to the device DEV and/or to the client CLT, or the digital certificate CERT-2 can be made available for being downloaded by the device DEC and/or the client CLT.

FIG. 9 displays a process flow diagram of a method for providing a second digital certificate CERT-1 according to an embodiment of the invention. The method comprises the optional step of authenticating AUTH-DEV the device DEV based on the first digital certificate CERT-1, the step of receiving REC-RD registration data RD from the device DEV, the step of receiving REC-PBK-1 a second public key PBK-2 created by a client CLT of the device DEV, the step of sending SND-CSR-2 a second certificate signing request CSR-2 related to a second domain name DN-2 based on the second public key PBK-2 to the certificate authority CA, the step of receiving REC-CERT-2 a second digital certificate CERT-2 from the certificate authority CA and the step of providing PROV-CERT-2 the second digital certificate CERT-2 to the device DEV and/or to the client CLT. All these steps can comprise the advantageous and alternative embodiments and features as described with respect to the fourth process flow diagram of FIG. 8.

In particular, the process flow diagram of the method for providing a second digital certificate CERT-1 corresponds only to the steps for creating and providing the second digital certificate CERT-1 and can be executed independent of the method steps for providing the first digital certificate CERT-1.

FIG. 10 displays a process flow diagram of a method for installing a second digital certificate CERT-1 according to an embodiment of the invention.

According to the displayed embodiment, the method comprises the steps of determining DET-RD, by the client CLT, registration data RD, sending SND-RD, by the client CLT, the registration data RD to the device DEV, creating CRT-AKP-2, by the client CLT, a second asymmetric key pair, the second asymmetric key pair comprising a second public key PBK-1 and a second private key PRK-1, sending SND-PBK-2, by the client CLT, the second public key PBK-2 to the device DEV, and installing INST-CERT-2, by the client CLT, the second digital certificate CERT-2.

FIG. 11 displays a fifth process flow diagram of a method for providing a first digital certificate CERT-1 according to an embodiment of the invention. The fifth process flow diagram can be understood as extension of the third process flow diagram in FIG. 7, or as a stand-alone process flow diagram. In the latter case, the steps of providing PROV-CERT-1 the first digital certificate CERT-1 and of installing INST-CERT-1 the first digital certificate CERT-1 are optional steps.

The fifth process flow diagram furthermore comprises steps of the fourth process flow diagram displayed in FIG. 8 and the process flow diagram of a method for installing a second digital certificate CERT-1 of FIG. 10. Those steps can comprise all advantageous features and embodiments as described with respect to the respective figures.

The fifth process flow diagram furthermore comprises the optional steps of transmitting TRM-RD, by the device DEV, registration data RD to the server, transmitting TRM-PBK-2, by the device DEV, a second public key PBK-2 created by a client CLT of the device DEV to the server SRV, and transmitting TRM-CERT-2, by the device DEV, the second digital certificate to the client CLT.

The fifth process flow diagram furthermore comprises the optional step of proving ownership PRV-OWN' of the domain related to the second domain name DN-2. In particular, the step of proving ownership PRV-OWN' is executed via the ACME protocol (acronym for "Automatic Certificate Management Environment" described in RFC 8555, https://tools.ietf.org/html/rfc8555).

In this embodiment, the step of proving ownership PRV-OWN' comprises the substeps of receiving REC-CLG' a challenge from the certificate authority CA, determining DET-RSP' a response related to the challenge, wherein the response demonstrates control over the domain related to the second domain name DN-2, providing PROV-RSP' the response to the certificate authority CA, informing INF-CA' the certificate authority CA that the response has been provided.

In this embodiment, the challenge is to create a file with a given content at a certain location at the server being accessible based on the domain "ca1d5f5f7ba45 . . . com", for example a certain HTML file at "http://ca1d5f5f7ba 45 . . . com/authentication.html". Determining the response comprises actually creating this file and making it accessible to the public. Alternatively, The ACME method DNS-01 can be used.

In the displayed embodiment, the step of proving ownership PRV-OWN' is executed after the step of sending SND-CSR-2 the second certificate signing request CSR-2. It is also possible that first the step of proving ownership PRV-OWN' is executed, and afterwards the step of sending SND-CSR2 the second certificate signing request CSR-2 is executed.

In this embodiment, the method furthermore comprises receiving REC-CSR-2, by the certificate authority CA, the second certificate signing request CSR-2. Furthermore, the method comprises the step of receiving REC-INF', by the certification authority CA, information that the response has been provided by the server SRV, the step of verifying VRFRSP', by the certification authority CA, the response provided by the server SRV, the step of creating CRT-CERT-2 the second digital certificate CERT-2 based on the second public key PBK-2 and the first domain name DN-2, and the step of sending SND-CERT-2, by the certificate authority CA, the second digital certificate CERT-2 to the server SRV.

FIG. 12 displays a data flow diagram for a method for providing a DNS response DNS-RSP according to an embodiment of the invention. In the displayed embodiment, a requester REQ wants to have a DNS response related to a domain name D-DN of a device DEV in order to establish an encrypted communication based on a digital certificate CERT-1 of the device DEV.

In FIG. 12, the data flow is described for an interaction with the device DEV and based on the first digital certificate CERT-1. The same data flow could apply for an interaction with a client CLT based on the second digital certificate CERT-2 without significant changes.

In this embodiment, the requestor REQ creates a DNS request DNS-REQ and sends this DNS request DNS-REQ to the server. The DNS request DNS-REQ is directed to resolving a first fully qualified domain name FQDN-1. The first fully qualified domain name FQDN-1 comprises an encoded domain name E-DN of the device DEV and the first certificate identifier IDF-CERT-1 related to the first digital certificate CERT-1 owned by the device DEV.

After receiving the DNS request DNS-REQ, the server responds with a DNS response DNS-RSP. In this embodiment, the DNS response is a CNAME resource record comprising the decoded domain name D-DN. Examples for encoded domain names E-DN and corresponding decoded domain names D-DN are described with respect to FIG. 17.

Based on the DNS response DNS-RSP, the requestor REQ can established a secured connection between the requestor REQ and the client CLT. In particular, the requestor REQ can send an authentication request AUTH-REQ to the device DEV and receive an authentication response AUTH-RSP from the device DEV, wherein the authentication response AUTH-RSP demonstrates the knowledge of the first private key PRK-1 at the device DEV. An example of this procedure is HTTPS handshake. After authenticating, a secured connection can be established, and data DAT can be exchanged between the requester REQ and the device DEV in an encrypted way.

FIG. 13 displays a first process flow diagram of a method for providing a DNS response DNS-RSP according to an embodiment of the invention.

The first step of the displayed embodiment is receiving REC-DNS-REQ, from a requestor REQ, a DNS request DNS-REQ for resolving a fully qualified domain name FQDN-1, FQDN-2, FQDN-1', FQDN-2'. Here, the fully qualified domain name (FQDN-1, FQDN-2, FQDN-1', FQDN-2') comprises as a label an encoded domain name E-DN. The step of receiving REC-DNS-REQ a DNS request DNS-REQ is executed by a device server SRV, in particular, by an interface SRV.IF of the server.

The second step of the displayed embodiment is determining DET-D-DN a decoded domain name D-DN based on the encoded domain name E-DN. In this embodiment, the step of determining DET-D-DN a decoded domain name D-DN is executed by the server SRV. In particular, the decoded domain name D-DN can be obtained from the encoded domain name E-DN by replacing the special character "--" or "---" by the dot character "." separating different levels in a domain name.

The last step of the displayed embodiment is providing PROV-DNS-RSP, to the requestor REQ, a DNS response DNS-RSP, wherein the DNS response DNS-RSP comprises the decoded domain name D-DN. In particular, the step of providing PROV-DNS-RSP the DNS response DNS-RSP is executed by the server SRV. In particular, the DNS response DNS-RSP corresponds to a CNAME resource record.

FIG. 14 displays a second process flow diagram of a method for providing a DNS response DNS-RSP according to an embodiment of the invention.

The second process flow diagram corresponds to the first process flow diagram displayed in FIG. 13, but the second process flow diagram indicates the corresponding step that are executed by the requestor REQ.

FIG. 15 displays a third process flow diagram of a method for providing a DNS response DNS-RSP according to an embodiment of the invention. The third process flow diagram is a combination of the first process flow diagram displayed in FIG. 13 and the second process flow diagram displayed in FIG. 14 and additionally comprises steps executed by the device DEV.

FIG. 16 displays domain names DN-1, DN-2, DN-1', DN-2' used in different embodiments of the invention. In particular, the domain names DN-1, DN-2, DN-1', DN-2' are wildcard domain names and used as subject within a digital certificate CERT-1, CERT-2, CERT-1', CERT-2'.

In this embodiment, the first domain name DN-1 is equivalent to the string "*.ca1d5f5f7ba45 . . . com". The first domain name DN-1 comprises an asterisk label "*", the first certificate identifier IDF-CERT-1 ("ca1d5f5f7ba45"), a domain part DMN-PRT ("cert.") and a top-level domain "com". The first domain name DN-1 does not comprise a DNS type identifier DNS-TYP. In an alternative embodiment, the first domain name DN-1 does comprise an DNS type identifier DNS-TYP ("a", to indicate that DNS requests are to be resolved to an A resource record). In this alternative embodiment, the first domain name DN-1 can be equivalent to the string "*.ca1d5f5f7ba45.cert.com" or to the string "*.a.ca1d5f5f7ba45.cert.com", because the order of the first certificate identifier IDF-CERT-1 and the DNS type identifier DNS-TYP can be interchanged. However, it has to be noted that in any case different strings in the first domain name DN-1 would correspond to different first digital certificate CERT1, since the first domain name DN-1 is normally included as the subject of the first digital certificate CERT-1.

In the displayed embodiment, the second domain name DN-2 is equivalent to the string "*.ca1d5f5f7ba45.client-abc . . . com". The second domain name DN-2 comprises an asterisk label "*", the first certificate identifier IDF-CERT-1 ("ca1d5f5f7ba45"), the client identifier IDF-CLT "client-abc", the domain part DMN-PRT ("cert.") and the top-level domain "com". In particular, the domain part DMN-PRT ("cert.") and the top-level domain "com" are equivalent with the respective parts of the first domain name DN-1. As the first domain name DN-1, the second domain name DN-2 can optionally comprise the DNS type identifier DNS-TYP. The first certificate identifier IDF-CERT-1 ("ca1d5f5f7ba45") and the client identifier IDF-CLT "client-abc" form the second certificate identifier IDF-CERT-2.

In an alternative, not displayed embodiment, the second domain name DN-2 can comprise a second certificate identifier IDF-CERT-2 (here "6c15b0f00a08") different form the first certificate identifier IDF-CERT-1 and not comprising the first certificate identifier IDF-CERT-1. In particular, in this alternative, the second domain name DN-2 do not comprise the client identifier CLT-IDF. In this alternative, the second domain name DN-2 is equivalent to the string "*.6c15b0f00a08 . . . com".

In this embodiment, the modified first domain name DN-1' is equivalent to the string "*.ca1d5f5f7ba45.cname . . . com". The first domain name DN-1 comprises an asterisk label "*", the first certificate identifier IDF-CERT-1 ("ca1d5f5f7ba45"), a domain part DMN-PRT ("cert."), a top-level domain "com" and a DNS type identifier DNS-TYP' ("cname", to indicate that DNS requests are to be resolved to an CNAME resource record). In an alternative embodiment, the modified first domain name DN-1 can also be equivalent to the string "*.cname.ca1d5f5f7ba45.cert.com", because the order of the first certificate identifier IDF-CERT-1 and the DNS type identifier DNS-TYP' can be interchanged. However, it has to be noted that in any case different strings as modified first domain name DN-1' would correspond to different modified first digital certificates CERT-1', since the modified first domain name DN-1' is normally included as the subject of the modified first digital certificate CERT-1'.

In the displayed embodiment, the modified second domain name DN-2' is equivalent to the string "*.ca1d5f5f7ba45.client-abc . . . com". The second domain name DN-2 comprises an asterisk label "*", the first certificate identifier IDF-CERT-1 ("ca1d5f5f7ba45"), the client identifier IDF-CLT "client-abc", the domain part DMN-PRT ("cert.") and the top-level domain "com". In particular, the domain part DMN-PRT ("cert.") and the top-level domain "com" are equivalent with the respective parts of the first domain name DN-1. As the modified first domain name DN-1', the modified second domain name DN-2' comprises the DNS type identifier DNS-TYP'. The first certificate identifier IDF-CERT-1 ("ca1d5f5f7ba45") and the client identifier IDF-CLT "client-abc" form the second certificate identifier IDF-CERT-2.

In an alternative, not displayed embodiment, the modified second domain name DN-2' can comprise the second certificate identifier IDF-CERT-2 (here "6c15b0f00a08") different form the first certificate identifier IDF-CERT-1 and not comprising the first certificate identifier IDF-CERT1. In particular, in this alternative, the modified second domain name DN-2' does not comprise the client identifier CLT-IDF. In this alternative, the modified second domain name DN-2' is equivalent to the string "*.6c15b0f00a08 . . . com".

FIG. 17 displays fully qualified domain names FQDN-1, FQDN-2, FQDN-1', FQDN-2' used in different embodiments of the invention. In particular, the fully qualified domain names FQDN-1, FQDN-2, FQDN-1', FQDN-2' are used in DNS requests.

The first fully qualified domain name FQDN-1 and the second fully qualified domain name FQDN-2 are based on the first domain name DN-1 and the second domain name DN-2, wherein the asterisk label AL of the first domain name DN-1 and the second domain name DN-2 are replaced with an encoded domain name E-DN. The modified first fully qualified domain name FQDN-1' and the modified second fully qualified domain name FQDN-2' are based on the modified first domain name DN-1' and the modified second domain name DN-2', wherein the asterisk label AL of the modified first domain name DN-1' and the modified second domain name DN-2' are replaced with an encoded IP address name E-IP.

An encoded domain name E-DN is based on a corresponding decoded domain name D-DN. In particular, all dot characters "." In the decoded domain name D-DN (which are separating different levels of the decoded domain name D-DN) need to be replaced with a special character or a special sequence of characters (e.g. a double dash "--" or a triple dash "---", so that the encoded domain name E-DN does not span different levels of the corresponding fully qualified domain name FQDN-1, FQDN-2. For example, if the decoded domain name D-DN corresponds to the string "pacs. abc.", the encoded domain name E-DN can correspond to the string "pacs--abc--" or "pacs---abc---".

An encoded IP address E-IP is based on a corresponding decoded IP address D-IP. In particular, all dot characters "." In the decoded IP address D-IP (which are separating different subnets of the decoded IP address D-IP) need to be replaced with a special character or a special sequence of characters (e.g. a single dash "-"), so that the encoded IP address E-IP does not span different levels of the corresponding fully qualified domain name FQDN-1', FQDN-2'. For example, if the decoded IP address D-IP corresponds to the string "192 . . . ", the encoded IP address E-IP can correspond to the string "192-".

In the displayed embodiment, for determining which DNS response type to use, the existence and/or the content of the DNS type identifier DNS-TYP, DNS-TYP' within the fully qualified domain name FQDN-1, FQDN-2, FQDN-1', FQDN-2' is used, wherein the DNS type identifier DNS-TYP, DNS-TYP' is a separate label of the fully qualified domain name FQDN-1, FQDN-2, FQDN-1', FQDN-2'. Alternatively, the DNS type identifier DNS-TYP, DNS-TYP' can also be part of the encoded IP address E-IP and/or the encoded domain name E-DN, in particular, the DNS type identifier DNS-TYP, DNS-TYP' can be part of the lowest level of the fully qualified domain name FQDN-1, FQDN-2, FQDN-1', FQDN-2'. For example, the first two characters of the lowest label can correspond to the characters "ip" to indicate that an A record resource or an AAAA record resource is expected as an response, and the first two characters of the lowest label can correspond to the characters "dn" to indicate that an CNAME record resource is expected as an response.

FIG. 18 displays a first embodiment of a server SRV, a device DEV, a certificate authority CA, a requestor REQ and a client CLT according to an embodiment of the invention. FIG. 19 displays a second embodiment of a server SRV, a device DEV, a certificate authority CA, a requestor REQ and a client CLT according to an embodiment of the invention. FIG. 20 displays a third embodiment of a server SRV, a device DEC, a certificate authority CA, a requestor REQ and a client CLT according to an embodiment of the invention.

In the first embodiment displayed in FIG. 18, and in the second embodiment displayed in FIG. 19, the server SRV is configured for executing the methods for providing a first digital certificate CERT-1 according to the invention and/or for executing the methods for providing a DNS response DNS-RSP according to the invention. Optionally, the system displayed in FIG. 18 or FIG. 19 can comprise a broker BRK. The broker BRK can be interpreted as part of the server SRV, and is configured for receiving the authentication data AD and/or for validating the authentication data AD. The broker BRK can be located at the internal network of the server SRV or be a physical part of the server (as displayed in FIG. 18), alternatively the broker BRK can be a device located inside the intranet INTR of the device DEV (as displayed in FIG. 19).

In the third embodiment displayed in FIG. 20, the server SRV comprises two independent entities, a registration server SRV.REG configured for executing the methods for providing a first digital certificate CERT-1 according to embodiments of the invention, and a DNS server SRV.DNS configured for executing the methods for providing a DNS response DNS-RSP according to embodiments of the invention.

In the displayed embodiments of FIG. 18, FIG. 19 and FIG. 20, the device DEV, the client CLT and the requestor REQ are located in an intranet network INTR. Alternatively, the requestor REQ can be located outside of the intranet network INTR.

The server SRV, the registration server SRV.REG, the DNS server SRV.DNS the device DEV, the certificate authority CA, the broker BRK, the requestor REQ and/or the client CLT can be a (personal) computer, a workstation, a virtual machine running on host hardware, a microcontroller, or an integrated circuit. In particular, the server SRV, the registration server SRV.REG, the DNS server SRV.DNS the device DEV, the certificate authority CA, the broker BRK and/or the client CLT can be mobile devices, e.g. a smartphone or a tablet. As an alternative, the server SRV, the registration server SRV.REG, the DNS server SRV.DNS the device DEV, the certificate authority CA, the broker BRK and/or the client CLT can be a real or a virtual group of computers (the technical term for a real group of computers is "cluster", the technical term for a virtual group of computers is "cloud").

The device DEC and the server SRV can communicate either via a secure communication channel SCC and/or another network NETW. The network NETW can be realized as a LAN (acronym for "local area network"), in particular a WiFi network, or any other local connection. Alternatively, the network NETW can be the internet. The secure communication channel SCC can be a part of the connection via the network NETW, or it can be separated from the network. In particular, the secure communication channel SCC could be realized as a VPN (acronym for "virtual private network").

Each of the server SRV, the registration server SRV.REG, the DNS server SRV.DNS the device DEV, the certificate authority CA, the broker BRK and/or the client CLT can comprise an interface SRV.IF, DEV.IF, CLT.IF, a computation unit SRV.CU, DEV.CU, CLT.CU and a memory unit SRV.MU, DEV.MU, CLT.MU. An interface SRV.IF, DEV.IF, CLT.IF can be a hardware interface or as a software interface (e.g. PCIBus, USB or Firewire). A computation unit SRV.CU, DEV.CU, CLT.CU can comprise hardware elements and software elements, for example a microprocessor, a CPU (acronym for "central processing unit"), a GPU (acronym for "graphical processing unit"), a field programmable gate array (an acronym is "FPGA") or an ASIC (acronym for "application-specific integrated circuit"). A computation unit SRV.CU, DEV.CU, CLT.CU can be configured for multithreading, i.e. the computation unit can host different computation processes at the same time, executing the either in parallel or switching between active and passive computation processes.

The following clauses are also part of the disclosure:

Clause 1.1: A computer-implemented method for providing, by a server SRV, a first digital certificate CERT1 to a device DEV, comprising:

receiving REC-AD, from the device DEV, authentication data AD via a secure communication channel, receiving REC-IDF-CERT, from the device DEV, or determining DET-IDF-CERT, by the server SRV, a first certificate identifier IDF-CERT-1, in particular, wherein the first certificate identifier IDF-CERT-1 is a hash value, verifying VRF-AD the authentication data AD, receiving REC-PBK-1, from the device DEV, a first public key PBK-1 created by the device DEV, sending SND-CSR-1 a first certificate signing request CSR-1 related to a first domain name DN-1 based on the first public key PBK-1 to a certificate authority CA, wherein the first domain name DN-1 comprises the certificate identifier IDF-CERT-1, receiving REC-CERT-1 the first digital certificate CERT-1 from the certificate authority CA, wherein the first digital certificate CERT-1 is a wildcard certificate based on the first domain name DN-1 and the first public key PBK-1 signed by the certificate authority CA, providing PROV-CERT-1 the first digital certificate CERT-1 to the device DEV.

Clause 1.2: The method according to clause 1.1, wherein the first domain name DN-1 comprises an asterisk label AL.

Clause 1.3: The method according to clause 1.2, wherein the asterisk label AL is the last label of the first domain name DN-1.

Clause 1.4: The method according to clause 1.1 or clause 1.2, wherein the first certificate identifier IDFCERT-1 is a label of the first domain name DN-1 different from the last label of the first domain name DN-1.

Clause 1.5: The method according to clause 1.4, wherein the first certificate identifier IDF-CERT-1 is the second last label of the first domain name DN-1.

Clause 1.6: The method according to one of the clauses 1.1 to 1.4, furthermore comprising:

proving ownership PRV-OWN of the domain related to the first domain name DN-1.

Clause 1.7: The method according to clause 1.6, wherein the step of proving ownership PRV-OWN comprises at least one of the following substeps:

receiving REC-CLG a challenge from the certificate authority CA, determining DET-RSP a response related to the challenge, wherein the response demonstrates control over the domain related to the first domain name DN-1, providing PROV-RSP the response to the certificate authority CA, informing INF-CA the certificate authority CA that the response has been provided.

Clause 1.8: The method according to one of the clauses 1.1 to 1.7, wherein the authentication data AD comprises a pre-shared secret, in particular, wherein the pre-shared secret is based on at least one of:

a pre-shared one-time password, a pre-shared key, a pre-shared hardware token.

Clause 1.9: The method according to one of the clauses 1.1 to 1.8, wherein the authentication data AD comprises a device identifier IDF-DEV of the device DEV, in particular, wherein the device identifier IDF-DEV is based on a material number of the device DEV and/or a serial number of the device DEV.

Clause 1.10: The method according to one of the clauses 1.1 to 1.9, furthermore comprising sending SND-CSR-1' a modified first certificate signing request CSR-1' related to a modified first domain name DN-1' based on the first public key PBK-1 to the certificate authority CA, wherein the modified first domain name DN-1' comprises the certificate identifier IDF-CERT-1, receiving REC-CERT-1' a modified first digital certificate CERT-1' from the certificate authority CA, wherein the modified first digital certificate CERT-1' is a wildcard certificate based on the modified first domain name DN-1' and the first public key PBK-1 signed by the certificate authority CA, providing PROV-CERT-1' the modified first digital certificate CERT-1' to the device DEV.

Clause 1.11: The method according to one of the clauses 1.1 to 1.10, furthermore comprising creating CRT-DNS a DNS resource record for the first domain name DN-1 and/or for the modified first domain name DN-1'.

Clause 1.12: The method according to one of the clauses 1.1 to 1.11, furthermore comprising storing STR-USG a usage information related to the authentication data AD to prevent re-using the authentication data AD.

Clause 1.13: The method according to one of the clauses 1.1 to 1.12, furthermore comprising:

optionally, authenticating AUTH-DEV the device DEV based on the first digital certificate CERT-1, receiving REC-RD registration data RD from the device DEV, wherein the registration data RD comprise a second certificate identifier IDF-CERT-2, receiving REC-PBK-1 a second public key PBK-2 created by a client CLT of the device DEV, sending SND-CSR-2 a second certificate signing request CSR-2 related to a second domain name DN-2 based on the second public key PBK-2 to the certificate authority CA, wherein the second domain name DN-2 comprises the second certificate identifier IDF-CERT-2, receiving REC-CERT-2 a second digital certificate CERT-2 from the certificate authority CA, wherein the second digital certificate CERT-2 is a wildcard certificate based on the second domain name DN-2 signed by the certificate authority CA, providing PROV-CERT-2 the second digital certificate CERT-2 to the device DEV and/or to the client CLT.

Clause 1.14: The method according to clause 1.13, wherein the second certificate identifier IDF-CERT-2 comprises the first certificate identifier IDF-CERT-1 and a client identifier IDF-CLT related to the client CLT.

Clause 1.15: The method according to clause 1.14, wherein the second domain name DN-2 comprises an asterisk label AL, wherein the asterisk label AL is the last label of the second domain name DN-2, wherein the first certificate identifier IDF-CERT-1 is the second last label of the second domain name DN-2, and wherein the client identifier IDF-CLT is the third last label of the second domain name DN-2.

Clause 1.16: The method according to clause 1.14, wherein the second domain name DN-2 comprises an asterisk label AL, wherein the asterisk label AL is the last label of the second domain name DN-2, wherein the first certificate identifier IDF-CERT-1 is the third last label of the second domain name DN-2, and wherein the client identifier IDF-CLT is the second last label of the second domain name DN-2.

Clause 1.17: The method according to one of the clauses 1.1 to 1.16, furthermore comprising:

creating a DICOM node configuration based on the first digital certificate CERT-1 and/or the second digital certificate CERT-2.

Clause 2.1: A computer-implemented method for installing a first digital certificate CERT-1 on a device DEV, comprising:

determining DET-AD, by the device DEV, authentication data for authenticating the device at a server SRV sending SND-AD, by the device DEV, the authentication data to the server via a secure communication channel, receiving REC-AD, by the server SRV, the authentication data AD via the secure communication channel, verifying VRF-AD, by the server SRV, the authentication data AD, sending SND-IDF-CERT, by the device DEV, a first certificate identifier REC-IDF-CERT to the server SRV, in particular, wherein the first certificate identifier IDF-CERT-1 is a hash value or a random value, receiving REC-IDF-CERT, by the server SRV, the first certificate identifier IDF-CERT-1, creating CRT-AKP-1, by the device DEV, a first asymmetric key pair, the asymmetric key pair comprising a first public key PBK-1 and a first private key PRK-1, sending SND-PBK-1, by the device DEV, the first public key PBK-1 to the server SRV, receiving REC-PBK-1, by the server SRV, the first public key PBK-1 created by the device DEV, sending SND-CSR-1, by the server SRV a first certificate signing request CSR-1 related to a first domain name DN-1 based on the first public key PBK-1 to a certificate authority CA, wherein the first domain name DN-1 comprises the certificate identifier IDF-CERT-1, receiving REC-CERT-1, by the server SRV, the first digital certificate CERT-1 from the certificate authority CA, wherein the first digital certificate CERT-1 is a wildcard certificate based on the first domain name DN-1 and the first public key PBK-1 signed by the certificate authority CA, providing PROV-CERT-1, by the server SRV the first digital certificate CERT-1 to the device DEV, installing INST-CERT-1, by the device DEV, the first digital certificate CERT-1 on the device DEV.

Clause 2.2: The method according to clause 2.1, wherein the first domain name DN-1 comprises an asterisk label AL.

Clause 2.3: The method according to clause 2.2, wherein the asterisk label AL is the last label of the first domain name DN-1.

Clause 2.4: The method according to clause 2.1 or clause 2.2, wherein the first certificate identifier IDFCERT-1 is a label of the first domain name DN-1 different from the last label of the first domain name DN-1.

Clause 2.5: The method according to clause 2.4, wherein the first certificate identifier IDF-CERT-1 is the second last label of the first domain name DN-1.

Clause 2.6: The method according to one of the clauses 2.1 to 2.4, furthermore comprising:
proving ownership PRV-OWN of the domain related to the first domain name DN-1.

Clause 2.7: The method according to clause 2.6, wherein the step of proving ownership PRV-OWN comprises at least one of the following substeps:
receiving REC-CLG a challenge from the certificate authority CA,
determining DET-RSP a response related to the challenge, wherein the response demonstrates control over the domain related to the first domain name DN-1,
providing PROV-RSP the response to the certificate authority CA,
informing INF-CA the certificate authority CA that the response has been provided.

Clause 2.8: The method according to one of the clauses 2.1 to 2.7, wherein the authentication data AD comprises a pre-shared secret, in particular, wherein the pre-shared secret is based on at least one of:
a pre-shared one-time password,
a pre-shared key,
a pre-shared hardware token.

Clause 2.9: The method according to one of the clauses 2.1 to 2.8, wherein the authentication data AD comprises a device identifier IDF-DEV of the device DEV, in particular, wherein the device identifier IDF-DEV is based on a material number of the device DEV and/or a serial number of the device DEV.

Clause 2.10: The method according to one of the clauses 2.1 to 2.9, furthermore comprising
sending SND-CSR-1', by the server SRV, a modified first certificate signing request CSR-1' related to a modified first domain name DN-1' based on the first public key PBK-1 to the certificate authority CA, wherein the modified first domain name DN-1' comprises the certificate identifier IDF-CERT-1,
receiving REC-CERT-1', by the server SRV, a modified first digital certificate CERT-1' from the certificate authority CA,
wherein the modified first digital certificate CERT-1' is a wildcard certificate based on the modified first domain name DN-1' and the first public key PBK-1 signed by the certificate authority CA,
providing PROV-CERT-1', by the server SRV, the modified first digital certificate CERT-1' to the device DEV,
installing INST-CERT-1, by the device DEV, the modified first digital certificate CERT-1' on the device DEV.

Clause 2.11: The method according to one of the clauses 2.1 to 1.11, furthermore comprising
creating CRT-DNS a DNS resource record for the first domain name DN-1 and/or for the modified first domain name DN-1'.

Clause 2.12: The method according to one of the clauses 2.1 to 2.11, furthermore comprising
storing STR-USG a usage information related to the authentication data AD to prevent re-using the authentication data AD.

Clause 2.13: The method according to one of the clauses 2.1 to 2.12, furthermore comprising:
optionally, authenticating AUTH-DEV the device DEV based on the first digital certificate CERT-1,
transmitting TRM-RD, by the device DEV, registration data RD to the server, wherein the registration data RD comprise a second certificate identifier IDF-CERT-2,
receiving REC-RD, by the server SRV, the registration data RD from the device DEV,
transmitting TRM-PBK-2, by the device DEV, a second public key PBK-2 created by a client CLT of the device DEV to the server SRV,
receiving REC-PBK-2, by the server SRV, the second public key PBK-2,
sending SND-CSR-2, by the server SRV, a second certificate signing request CSR-2 related to a second domain name DN-2 based on the second public key PBK-2 to the certificate authority CA, wherein the second domain name DN-2 comprises the second certificate identifier IDF-CERT-2,
receiving REC-CERT-2, by the server SRV, a second digital certificate CERT-2 from the certificate authority CA, wherein the second digital certificate CERT-2 is a wildcard certificate based on the second domain name DN-2 signed by the certificate authority CA,
providing PROV-CERT-2, by the server SRV, the second digital certificate CERT-2 to the device DEV and/or to the client CLT, optionally comprising transmitting TRM-CERT-2, by the device DEC, the second digital certificate to the client CLT.

Clause 2.14: The method according to clause 2.14, furthermore comprising:
determining DET-RD, by the client CLT, the registration data RD, sending SND-RD, by the client CLT, the registration data RD to the device, creating CRT-AKP-2, by the client CLT, a second asymmetric key pair, the second asymmetric key pair comprising a second public key PBK-1 and a second private key PRK-1, sending SND-PBK-2, by the client CLT, the second public key PBK-2 to the device DEV, installing INST-CERT-2, by the client CLT, the second digital certificate CERT-2.

Clause 2.15: The method according to clause 2.13 or 2.14, wherein the second certificate identifier IDF-CERT-2 comprises the first certificate identifier IDF-CERT-1 and a client identifier IDF-CLT related to the client CLT.

Clause 2.16: The method according to clauses 2.15, wherein the second domain name DN-2 comprises an asterisk label AL, wherein the asterisk label AL is the last label of the second domain name DN-2, wherein the first certificate identifier IDF-CERT-1 is the second last label of the second domain name DN-2, and wherein the client identifier IDF-CLT is the third last label of the second domain name DN-2.

Clause 2.17: The method according to clauses 2.15, wherein the second domain name DN-2 comprises an asterisk label AL, wherein the asterisk label AL is the last label of the second domain name DN-2, wherein the first certificate identifier IDF-CERT-1 is the third last label of the second domain name DN-2, and wherein the client identifier IDF-CLT is the second last label of the second domain name DN-2.

Clause 2.18: The method according to one of the clauses 2.1 to 2.17, furthermore comprising:
creating a DICOM node configuration based on the first digital certificate CERT-1 and/or the second digital certificate CERT-2.

Clause 3.1: A method for providing a second digital certificate to a client CLT and/or a device DEV, comprising:
optionally, authenticating AUTH-DEV the device DEV based on a first digital certificate CERT-1,
receiving REC-RD registration data RD from the device DEV, wherein the registration data RD comprise a second certificate identifier IDF-CERT-2,
receiving REC-PBK-1 a second public key PBK-2 created by the client CLT of the device DEV,
sending SND-CSR-2 a second certificate signing request CSR-2 related to a second domain name DN-2 based on the second public key PBK-2 to a certificate authority CA, wherein the second domain name DN-2 comprises the second certificate identifier IDF-CERT-2,
receiving REC-CERT-2 a second digital certificate CERT-2 from the certificate authority CA,
wherein the second digital certificate CERT-2 is a wildcard certificate based on the second domain name DN-2 signed by the certificate authority CA,
providing PROV-CERT-2 the second digital certificate CERT-2 to the device DEV and/or to the client CLT.

Clause 3.2: The method according to clause 3.1, wherein the second certificate identifier IDF-CERT-2 comprises the first certificate identifier IDF-CERT-1 and a client identifier IDF-CLT related to the client CLT.

Clause 3.3: The method according to clause 3.2, wherein the second domain name DN-2 comprises an asterisk label AL, wherein the asterisk label AL is the last label of the second domain name DN-2, wherein the first certificate identifier IDF-CERT-1 is the second last label of the second domain name DN-2, and wherein the client identifier IDF-CLT is the third last label of the second domain name DN-2.

Clause 3.4: The method according to clause 3.2, wherein the second domain name DN-2 comprises an asterisk label AL, wherein the asterisk label AL is the last label of the second domain name DN-2, wherein the first certificate identifier IDF-CERT-1 is the third last label of the second domain name DN-2, and wherein the client identifier IDF-CLT is the second last label of the second domain name DN-2.

Clause 3.5: The method according to one of the clauses 3.1 to 1.4, furthermore comprising:
creating a DICOM node configuration based on the first digital certificate CERT-1 and/or the second digital certificate CERT-2.

Clause 4.1: A computer-implemented method for providing a DNS response, comprising:
receiving REC-DNS-REQ, from a requestor REQ, an DNS request DNS-REQ for resolving a fully qualified domain name FQDN-1, FQDN-2, FQDN-1', FQDN-2', wherein the fully qualified domain name FQDN-1, FQDN-2, FQDN1', FQDN-2' comprises as a label an encoded domain name E-DN,
determining DET-D-DN a decoded domain name D-DN based on the encoded domain name E-DN,
providing PROV-DNS-RSP, to the requestor REQ, a DNS response DNS-RSP, wherein the DNS response DNS-RSP comprises the decoded domain name D-DN.

Clause 4.2: The method according to clause 4.1, wherein the fully qualified domain name FQDN-1, FQDN-2, FQDN1', FQDN-2' can comprise as alternative to the encoded domain name E-DN an encoded IP address E-IP, furthermore comprising:
determining DET-DNS-TYP, based on the fully qualified domain name FQDN-1, FQDN-2, FQDN-1', FQDN-2', whether DNS request is related to an A resource record, to an AAAA resource record or to a CNAME resource record,
in the case that the DNS request is related to a CNAME resource record,
determining DET-D-DN the decoded domain name D-DN based on the encoded domain name E-DN,
providing PROV-DNS-RSP, to the requestor REQ, the DNS response DNS-RSP, wherein the DNS response DNS-RSP comprises the CNAME resource record, and wherein the DNS response DNS-RSP comprises the decoded domain name D-DN,
in the case that the DNS request is related to a A resource record or an AAAA resource record,
determining DET-D-IP a decoded IP address D-IP based on the encoded IP address E-IP,
providing PROV-DNS-RSP, to the requestor REQ, the DNS response DNS-RSP, wherein the DNS response DNS-RSP comprises the A resource record or the AAAA resource record, and wherein the DNS response DNS-RSP comprises the decoded IP address D-IP.

Clause 4.3: The method according to clause 4.2, wherein the step of determining DET-DNS-TYP, based on the fully qualified domain name FQDN-1, FQDN-2, FQDN-1', FQDN-2', whether the DNS request is related to an A resource record, to an AAAA resource record or to a CNAME resource record, is based on the existence and/or content of a label not being the lowest label of the fully qualified domain name FQDN-1, FQDN-2, FQDN-1', FQDN-2'.

Clause 4.4: The method according to claim 12, wherein the step of determining DET-DNS-TYP, based on the fully qualified domain name FQDN-1, FQDN-2, FQDN-1', FQDN-2', whether the DNS request is related to an A resource record, to an AAAA resource record or to a CNAME resource record, is based on the content of the lowest label of the fully qualified domain name FQDN-1, FQDN-2, FQDN-1', FQDN-2'.

Clause 5.1: A server SRV for providing a first digital certificate CERT-1 to a device DEV, comprising an interface SRV.IF and a computation unit SRV.CU, configured for receiving REC-AD, from the device DEV, authentication data AD via a secure communication channel, configured for receiving REC-IDF-CERT, from the device DEV, or determining DET-IDF-CERT, by the server SRV, a first certificate identifier IDF-CERT-1, in particular, wherein the first certificate identifier IDF-CERT-1 is a hash value or random value, configured for verifying VRF-AD the authentication data AD, configured for receiving REC-PBK-1, from the device DEV, a first public key PBK-1 created by the device DEV, configured for sending SND-CSR-1 a first certificate signing request CSR-1 related to a first domain name DN-1 based on the first public key PBK-1 to a certificate authority CA, wherein the first domain name DN-1 comprises the certificate identifier IDF-CERT-1, and wherein a domain related to the first domain name DN-1 is controlled by the server SRV, configured for receiving REC-CERT-1 the first digital certificate CERT-1 from the certificate authority CA, wherein the first digital certificate CERT-1 is a wildcard certificate based on the first domain name DN-1 and the first public key PBK-1 signed by the certificate authority CA, configured for providing PROV-CERT-1 the first digital certificate CERT-1 to the device DEV.

Clause 5.2: The server according to clause 5.1, furthermore configured for executing the method according to one of the clauses 1.2 to 1.17.

Clause 5.3: A device DEV comprising an interface DEV.IF and a computation unit DEV.CU, configured for:

determining DET-AD authentication data for authenticating the device at a server SRV optionally sending SND-IDF-CERT a first certificate identifier IDF-CERT-1 to the server SRV, in particular, wherein the first certificate identifier IDF-CERT-1 is a hash value or a random value, creating CRT-AKP-1 a first asymmetric key pair, the asymmetric key pair comprising a first public key PBK-1 and a first private key PRK-1, sending SND-PBK-1 the first public key PBK-1 to the server SRV, receiving and installing INST-CERT-1 a first digital certificate CERT-1 on the device DEV.

Clause 5.4: The device DEV according to clause 5.3, furthermore configured for executing the steps of the methods according to one of the clauses 2.2 to 2.18.

Clause 5.5: A client CLT comprising an interface CLT.IF and a computation unit CLT.CU, the client CLT being a client of a device DEV, configured for determining DET-RD registration data RD, sending SND-RD the registration data RD to the device, creating CRT-AKP-2 a second asymmetric key pair, the second asymmetric key pair comprising a second public key PBK-1 and a second private key PRK-1, sending SND-PBK-2 the second public key PBK-2 to the device DEV, receiving and installing INST-CERT-2 a second digital certificate CERT-2.

Clause 5.6: A system comprising a server SRV according to one of the clauses 5.1 or 5.2, a device DEV according to one of the clauses 5.3 or 5.4.

Clause 5.7: The system according to clause 5.6, furthermore comprising:

a client CLT according to clause 5.5.

Clause 5.8: The system according to clause 5.7, wherein the client CLT and the device DEV are located in an intranet INTR.

Clause 5.9: A DNS server comprising an interface and a computation unit, configured for:

receiving REC-DNS-REQ, from a requestor REQ, an DNS request DNS-REQ for resolving a fully qualified domain name FQDN-1, FQDN-2, FQDN-1', FQDN-2', wherein the fully qualified domain name FQDN-1, FQDN-2, FQDN-1', FQDN-2' comprises as a label an encoded domain name E-DN, determining DET-D-DN a decoded domain name D-DN based on the encoded domain name E-DN, providing PROV-DNS-RSP, to the requestor REQ, a DNS response DNS-RSP, wherein the DNS response DNS-RSP comprises the decoded domain name D-DN.

Clause 5.10: The DNS server according to clause 5.9, furthermore configured for executing the method according to one of the clauses 4.2 to 4.4.

Wherever not already described explicitly, individual embodiments, or their individual embodiments and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for providing, by a server, a first digital certificate to a device, the computer-implemented method comprising:
   receiving authentication data from the device via a secure communication channel;
   receiving a first certificate identifier from the device, or determining the first certificate identifier via the server, the first certificate identifier being a hash value or a random value;
   verifying the authentication data;
   receiving a public key from the device, the first public key being created by the device;
   sending a first certificate signing request to a certificate authority, the first certificate signing request being related to a first domain name based on the first public key, and the first domain name including the first certificate identifier;
   receiving the first digital certificate from the certificate authority, the first digital certificate being signed by the certificate authority, and the first digital certificate being a first wildcard certificate based on the first domain name of the first digital certificate and the first public key of the first digital certificate; and
   providing the first digital certificate to the device; wherein
      a domain related to the first domain name is controlled by the server, and
      the first certificate identifier is a label of the first domain name, the label of the first domain being different from a last label of the first domain name.

2. The computer-implemented method of claim 1, wherein
   the first domain name includes an asterisk label, and
   the asterisk label is the last label of the first domain name.

3. The computer-implemented method of claim 1, further comprising:
   proving ownership of the domain related to the first domain name.

4. The computer-implemented method of claim 1, wherein
   the authentication data includes a pre-shared secret, and
   the pre-shared secret is based on at least one of a pre-shared one-time password, a pre-shared key, or a pre-shared hardware token.

5. The computer-implemented method of claim 1, wherein
   the authentication data includes a device identifier of the device, and
   the device identifier is based on at least one of a material number of the device or a serial number of the device.

6. The computer-implemented method of claim 1, further comprising:
   sending a modified first certificate signing request to the certificate authority, the modified first certificate signing request being related to a modified first domain name based on the first public key, the modified first domain name including the first certificate identifier;
   receiving a modified first digital certificate from the certificate authority, the modified first digital certificate being signed by the certificate authority, and the modified first digital certificate being a second wildcard certificate based on the modified first domain name of the modified first digital certificate and the first public key of the modified first digital certificate; and
   providing the modified first digital certificate to the device.

7. The computer-implemented method of claim 1, further comprising:
   authenticating the device based on the first digital certificate;
   receiving registration data from the device, the registration data including a second certificate identifier;
   receiving a second public key created by a client of the device;
   sending a second certificate signing request to the certificate authority, the second certificate signing request being related to a second domain name based on the second public key, and the second domain name including the second certificate identifier;
   receiving a second digital certificate from the certificate authority, the second digital certificate being signed by the certificate authority, and the second digital certificate being a second wildcard certificate based on the second domain name of the second digital certificate; and
   providing the second digital certificate to at least one of the device the client.

8. The computer-implemented method of claim 7, wherein the second certificate identifier includes the first certificate identifier and a client identifier related to the client.

9. The computer-implemented method of claim 8, wherein
   the second domain name includes an asterisk label, the asterisk label being a last label of the second domain name,
   the first certificate identifier is a second to last label of the second domain name, and
   the client identifier is a third to last label of the second domain name.

10. The computer-implemented method of claim 1, further comprising:
    creating a digital imaging and communications in medicine (DICOM) node configuration based on the first digital certificate.

11. A non-transitory computer program product storing instructions that, when executed by a computer, cause the computer to carry out the computer-implemented method of claim 1.

12. A non-transitory computer-readable medium storing executable instructions that, when executed by a computer, cause the computer to carry out the computer-implemented method of claim 1.

13. The computer-implemented method of claim 1, wherein the first certificate identifier is a second to last label of the first domain name.

14. The computer-implemented method of claim 3, wherein proving ownership includes at least one of:
- receiving a challenge from the certificate authority; or
- providing a response related to the challenge for the certificate authority, wherein the response demonstrates control over a domain related to the first domain name.

15. A server for providing a first digital certificate to a device, the server comprising;
- an interface and a computation unit, configured to
  - receive authentication data from the device via a secure communication channel,
  - receive a first certificate identifier from the device, or determine the first certificate identifier, the first certificate identifier being a hash value or a random value,
  - verify the authentication data,
  - receive a first public key from the device, the first public key being created by the device,
  - send a first certificate signing request to a certificate authority, the first certificate signing request being related to a first domain name based on the first public key, and the first domain name including the first certificate identifier,
  - receive the first digital certificate from the certificate authority, the first digital certificate being signed by the certificate authority, and the first digital certificate being a wildcard certificate based on the first domain name of the first digital certificate and the first public key of the first digital certificate, and
  - provide the first digital certificate to the device,
  wherein
  - a domain related to the first domain name is controlled by the server, and
  - the first certificate identifier is a label of the first domain name, the label being different from a last label of the first domain name.

\* \* \* \* \*